United States Patent
Insana et al.

(10) Patent No.: US 7,051,660 B2
(45) Date of Patent: May 30, 2006

(54) CARRIAGE ASSEMBLY FOR POSITIONING RAILROAD CARS

(75) Inventors: Samuel P. Insana, Washington, PA (US); Duane B. Swartz, McKees Rocks, PA (US)

(73) Assignee: Metso Minerals Industries, Inc., Canonsburg, PA (US)

( * ) Notice: Subject to any disclaimer, the term of this patent is extended or adjusted under 35 U.S.C. 154(b) by 76 days.

(21) Appl. No.: 10/818,275

(22) Filed: Apr. 5, 2004

(65) Prior Publication Data

US 2004/0194655 A1    Oct. 7, 2004

Related U.S. Application Data

(60) Provisional application No. 60/460,181, filed on Apr. 4, 2003.

(51) Int. Cl.
*B61J 3/04* (2006.01)
(52) U.S. Cl. .................... 104/162; 104/172.5; 104/178
(58) Field of Classification Search ................ 104/162, 104/165, 172.1, 172.3, 172.4, 182, 172.5, 104/178; 180/167; 340/686.1, 686.6, 431; 198/732, 836
See application file for complete search history.

(56) References Cited

U.S. PATENT DOCUMENTS

| | | | | | |
|---|---|---|---|---|---|
| 3,522,772 | A | * | 8/1970 | Hunt | 104/162 |
| 3,605,297 | A | * | 9/1971 | Kershaw | 37/105 |
| 6,389,984 | B1 | * | 5/2002 | Brandt | 104/162 |
| 6,837,168 | B1 | * | 1/2005 | Goldbeck et al. | 104/162 |

* cited by examiner

*Primary Examiner*—Frantz F. Jules

(57) ABSTRACT

A railroad car positioning apparatus for positioning a railroad car along a railroad track includes a battery-powered and radio-controlled carriage assembly and first and second dog members mounted on the carriage assembly. The apparatus includes a main control unit for controlling the carriage assembly. The carriage assembly is controlled via radio communication between the carriage assembly and the main control unit. The dog members are generally extendable to an axle height of the railroad car to be acquired for contacting one of the axles of the railroad car. The apparatus further includes a plurality of hydraulic cylinders for moving the carriage assembly in a forward or reverse direction on a guide way disposed between the railroad tracks on which the railroad cars travel. The batteries on the carriage assembly may be remotely recharged using a contactless power transfer device, which includes a battery recharging device situated on the guide way.

19 Claims, 23 Drawing Sheets

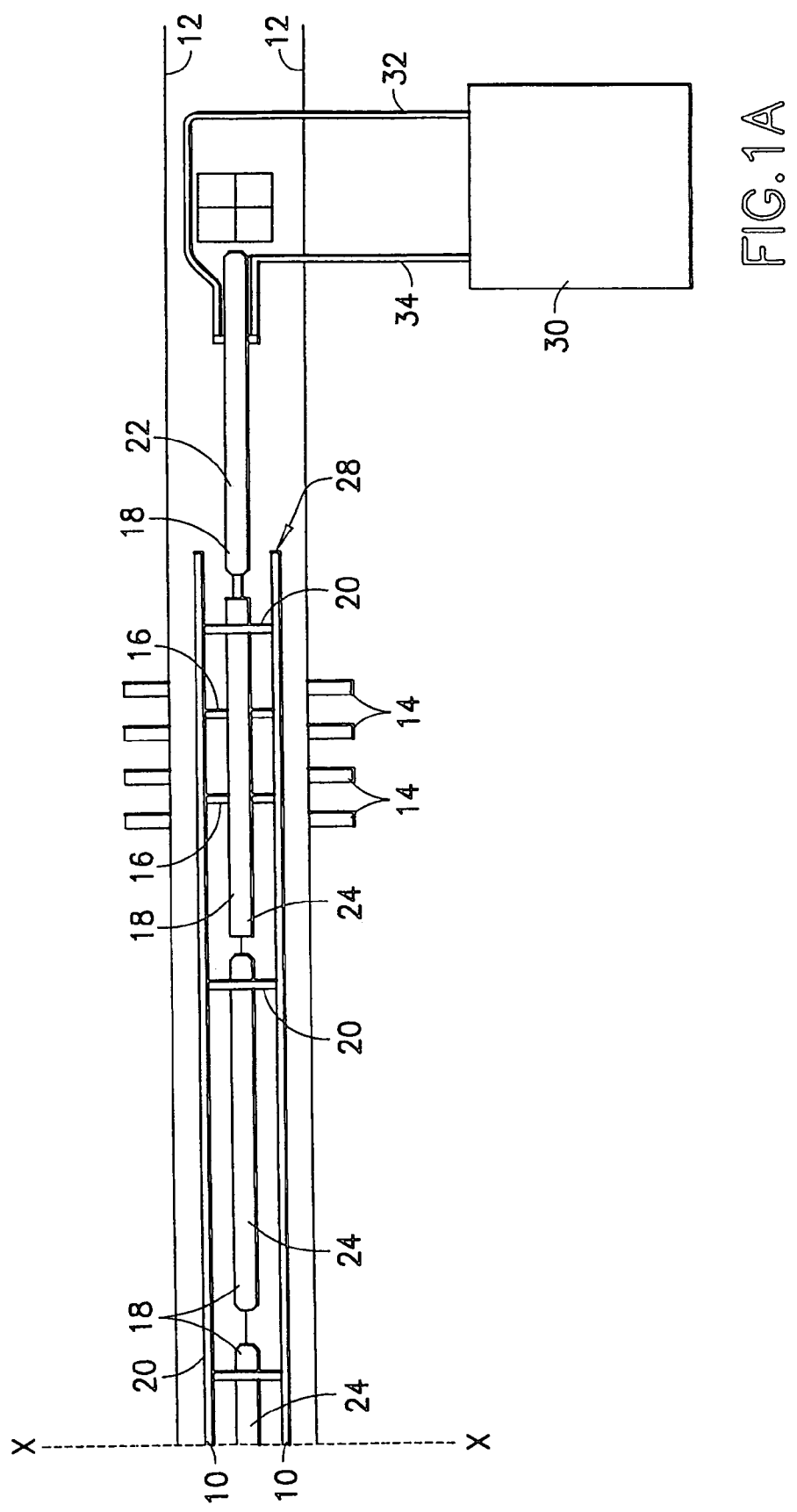

CARRIAGE ASSEMBLY FOR POSITIONING RAILROAD CARS

This application claims the benefit of provisional application No. 60/460,181 filed Apr. 4, 2003.

BACKGROUND OF THE INVENTION

1. Field of the Invention

The present invention relates to an apparatus for positioning a railroad car at a particular desired location along a railroad track, for example, at a loading/unloading site, at a weight scale, etc., and, more particularly, a radio-controlled and battery-powered carriage assembly for use in positioning such railroad cars and other similar vehicles.

2. Description of Related Art

Devices or vehicles for positioning railroad cars are generally known in the prior art. Generally, such devices or vehicles have operated by exerting a pushing force or pulling force upon the railroad cars. Accordingly, such devices or vehicles have not been capable of positively positioning and locking a railroad car at a particular desired location along the railroad track. Additionally, such devices or vehicles are often electrically powered by a remote power source connected to the device or vehicle by electrical conduits or power tracks. Such conduits often become entangled during operation of the positioning device or vehicle and limit the range, flexibility, and durability of operation of the positioning device or vehicle.

SUMMARY OF THE INVENTION

In general, the invention features a railroad car positioning apparatus for positioning a railroad car, the railroad car having at least two axles spaced apart along a longitudinal axis of the railroad car, each of the at least two axles being provided with wheels on the opposing ends thereof, the railroad car positioning device apparatus including: a carriage member; a first dog member mounted on the carriage member and a second dog member mounted on the carriage member; one or more radio-controlled and battery-powered devices for positioning the first dog member for extending the first dog member to at least a first position wherein the first dog member extends from the carriage member to at least the height of the axle members of the railroad car for contacting at least one of the axle members of the railroad car; one or more radio-controlled and battery-powered devices for selectively positioning the second dog member for extending the second dog member to at least either of a first position wherein the first dog member extends from the carriage member to at least the height of the axle members of the railroad car for contacting at least one of the axle members of the railroad car, and a second position wherein the second dog member is fully disposed and locked beneath the height of the axle members of the railroad car; and a displacement apparatus for displacing the carriage member in a direction parallel to the longitudinal axis of the railroad car and for exerting a force between at least one of the first and second dog members and at least one of the axle members of the railroad car and for thereby moving the railroad car. The same one or more radio controlled and battery-powered devices may be used to operate the first and second dog members. The railroad car positioning device may be powered by batteries that are charged by a contactless power transfer device and regulating profile battery charger or, alternatively, that would be charged using a contactless magnetic coupling to drive an alternator or generator that would charge the batteries. Such an arrangement eliminates the conventional use of wires or conduits. While described hereinafter in terms of a railroad car positioning device, the principles of the present invention may be applied to any type of powered vehicle such as mining machinery, towmotors, side arm railcar movers, man lifts, tripper conveyors, etc.

In one embodiment the present invention is an apparatus for automatically engaging and positioning railroad cars in a train of railroad cars along a railroad track. The apparatus generally includes a guide way situated between the pair of rails of the railroad track, a remotely-located main control unit, and a carriage assembly movable along the guide way. The carriage assembly is remotely controlled by the main control unit and is adapted to engage and position a railroad car in the train of railroad cars. The carriage assembly generally includes a support frame having wheels and adapted to move along a guide way provided between the pair of rails of the railroad track. A radio may be disposed on the support frame for transmitting radio signals to and receiving radio control signals from the remotely-located main control unit. At least one forward dog and at least one reverse dog are preferably pivotally mounted to the support frame. The at least one forward dog and at least one reverse dog are movable by an electrical cylinder or, alternatively, by respective electrical cylinders between a lowered position beneath an axle height of the railroad cars and a raised position for engaging the railroad car, for example, engaging an axle of the railroad car. Dog proximity indicators may be disposed on the support frame and electrically connected to the radio. The dog proximity indicators are generally adapted to produce signals indicating the positioning of the at least one forward dog and at least one reverse dog, respectively. A counting assembly may further be disposed on the support frame and be adapted to count the number of railroad cars, for example by counting axles or wheels thereof, that the carriage assembly passes as the carriage assembly moves along the guide way. The counting assembly includes a plurality of counting proximity indicators disposed on the support frame and electrically connected to the radio. The counting proximity indicators are adapted to produce signals when the carriage assembly reaches a preselected railroad car to be engaged by the at least one forward dog and at least one reverse dog. At least one of the dog proximity indicators may be positioned to be actuated by the at least one forward dog in a fully lowered position of the at least one forward dog and/or the at least one reverse dog. The proximity indicators may be battery-powered.

The apparatus may further include a plurality of guide way proximity indicators electrically connected to the main control unit and adapted to produce signals indicating at least the position of the carriage assembly on the guide way. The radio onboard the carriage assembly is preferably adapted to transmit the signals received from the dog proximity indicators and counting proximity indicators as radio signals to the main control unit, which controls the carriage assembly based on the received radio signals and the position signals received from the guide way proximity indicators. The main control unit preferably controls the carriage assembly by radio control signals transmitted to the radio disposed on the carriage assembly.

The carriage assembly may further include a lock device for holding the at least one forward dog and the at least one reverse dog in the raised position. The lock device includes a lock bar adapted to engage the at least one forward dog and the at least one reverse dog for holding the at least one forward dog and at least one reverse dog in the raised position, and a locking slide connected to the lock bar for moving the lock bar. The locking slide is movable by an electric cylinder, for example. The lock bar is movable between a locked position wherein the lock bar holds the at least one forward dog and at least one reverse dog in the raised position, and an unlocked position wherein the lock bar is disposed apart from the at least one forward dog and the at least one reverse dog. The carriage assembly may further include one or more lock bar proximity indicators disposed on the support frame and electrically connected to the radio. The lock bar proximity indicator(s) may be adapted to produce signals indicating when the lock bar is in the locked and unlocked positions and communicate the signals to the radio onboard the carriage assembly. The lock bar proximity indicator(s) may be battery-powered.

The radio, dog proximity indicators, lock bar proximity indicator(s) and counting proximity indicators onboard the carriage assembly may be battery-powered by batteries disposed on the support frame. The carriage assembly may further include a power disconnect switch for disconnecting the battery from the radio, dog proximity indicators, and counting proximity indicators. A battery charger may be disposed on the support frame for recharging the batteries, which may be associated with a contactless power transfer device disposed on the guide way. Alternatively, a charging plug may be disposed on the support frame for recharging the batteries.

The main control unit may include a trackside radio for transmitting the radio control signals to the radio disposed on the carriage assembly. The guide way proximity indicators may include an end travel proximity indicator, a wheel detector proximity indicator, and a deceleration proximity indicator disposed on the guide way, for example on one side of the guide way, at a reverse of travel end of the guide way. Additionally, the guide way proximity indicators may include a wheel clear proximity indicator disposed on the guide way, for example on an opposite side of the guide way from the end travel proximity indicator, wheel detector proximity indicator, and deceleration proximity indicator. Further, the guide way proximity indicators may include an end travel proximity indicator and deceleration proximity indicator disposed on the guide way at a forward travel end of the guide way. A method of acquiring and positioning railroad cars in a train of railroad cars along a railroad track utilizing the apparatus briefly summarized hereinabove is also disclosed, and involves radio control of the carriage assembly by the preferably track-side located main control unit. The present invention is also a method of charging the batteries on the carriage assembly by way of a contactless power transfer device eliminating the need for conventional wires or plugs. In a further embodiment of the apparatus for automatically engaging and positioning railroad cars in a train of railroad cars along a railroad track, the apparatus includes a guide way situated between the pair of rails of the railroad track, a battery recharging device situated on the guide way, and a carriage assembly movable along the guide way. The carriage assembly generally includes a support frame and a battery disposed on the support frame. The battery is generally adapted to be remotely recharged by the battery recharging device on the guide way when the carriage assembly is moved proximate to the battery recharging device and the battery is inductively coupled to the battery recharging device through ambient air.

Further details and advantages of the present invention will become apparent when reading the following detailed description in conjunction with the accompanying drawings.

BRIEF DESCRIPTION OF THE DRAWINGS

FIGS. 1A–1C each form part of a schematic plan view of the basic components making up an apparatus for positioning railroad cars in accordance with the present invention, and wherein FIGS. 1A–1C are to be aligned at the ends with one another at the match lines X—X and Z—Z indicated thereon;

DETAILED DESCRIPTION OF THE INVENTION

Figure 1B:
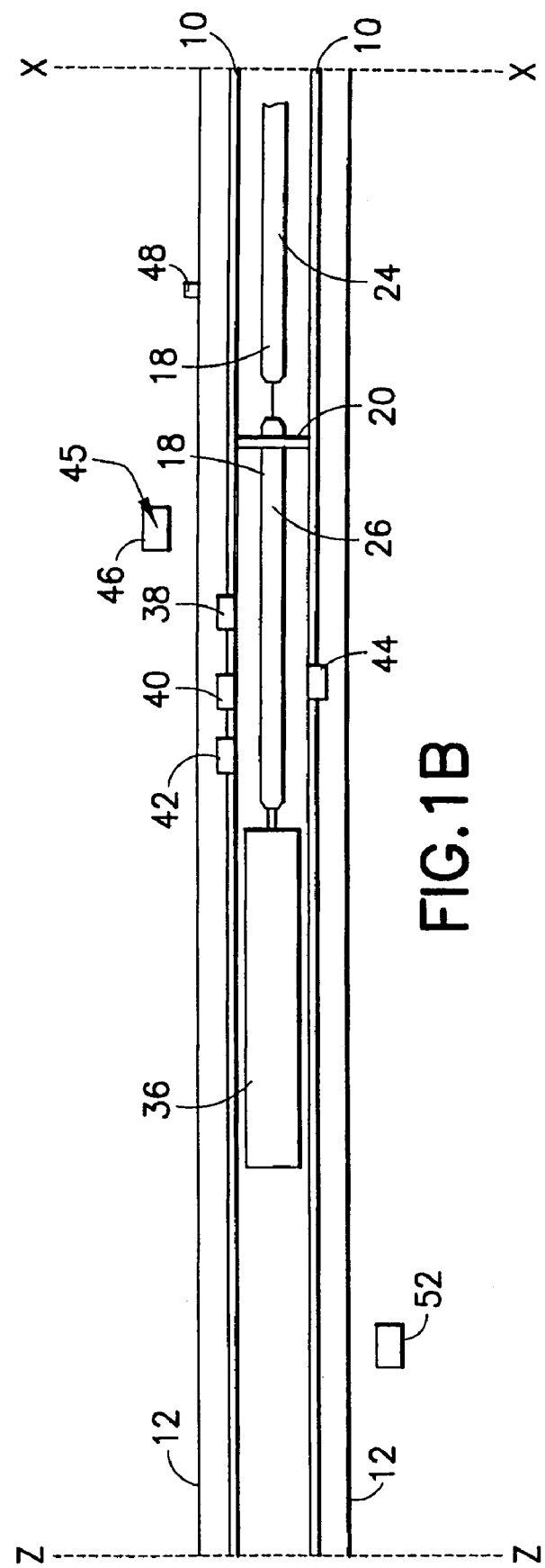

Referring first to FIG. 1A, a guide way 10, preferably consisting of two parallel guide tracks, is disposed in between and parallel to two rails 12 of a railroad track. The guide way 10 is preferably rigidly fastened to railroad ties 14. Steel ties 16 extend between and thereby brace the two parallel guide tracks of the guide way 10. Preferably, the steel ties 16 are oriented parallel to the railroad ties 14, and one steel tie 16 is located between every second pair of adjacent railroad ties 14.

A series of hydraulic cylinders 18 is disposed between the guide tracks of the guide way 10. The longitudinal axis of the cylinders 18 is preferably oriented parallel with and midway between the guide tracks of the guide way 10. Guide roller brackets 20, which span the width of the guide way 10, are provided for supporting the hydraulic cylinders 18. The guide roller brackets 20 are preferably equipped with rollers 70 (see FIG. 2) which are set into and ride within recesses provided in the parallel guide tracks of the guide way 10. The series of hydraulic cylinders preferably includes a first cylinder 22 and a last cylinder 26 (See FIG. 1B). Additionally, the series of hydraulic cylinders 18 may also include at least one cylinder 24, preferably five in number, disposed in series between the first cylinder 22 and the last cylinder 26.

One end of the guide way 10, as shown in FIG. 1A, is designated as being the reverse travel end 28. At the reverse travel end 28 of the guide way 10, a hydraulic power unit 30 is disposed, preferably alongside and outside of the rails 12 of the railroad track. The hydraulic power unit 30 is provided with connecting hoses 32 and 34 which place it in fluid communication with the first hydraulic cylinder 22.

The hydraulic power unit 30, which may be a commercially available component, includes an electric motor driving a fluid pressurizing pump, valves to route the pressurized fluid to either of the connecting hoses 32 or 34, pressure and flow control elements, and hydraulic fluid filters, all mounted on a fluid reservoir of suitable volume. Such hydraulic power units are well known in the art. An example of a similar hydraulic power unit may be found in U.S. Pat. No. 4,570,661, issued on Feb. 18, 1986 to Neale A. Chaplin incorporated herein by reference.

Figure 15:
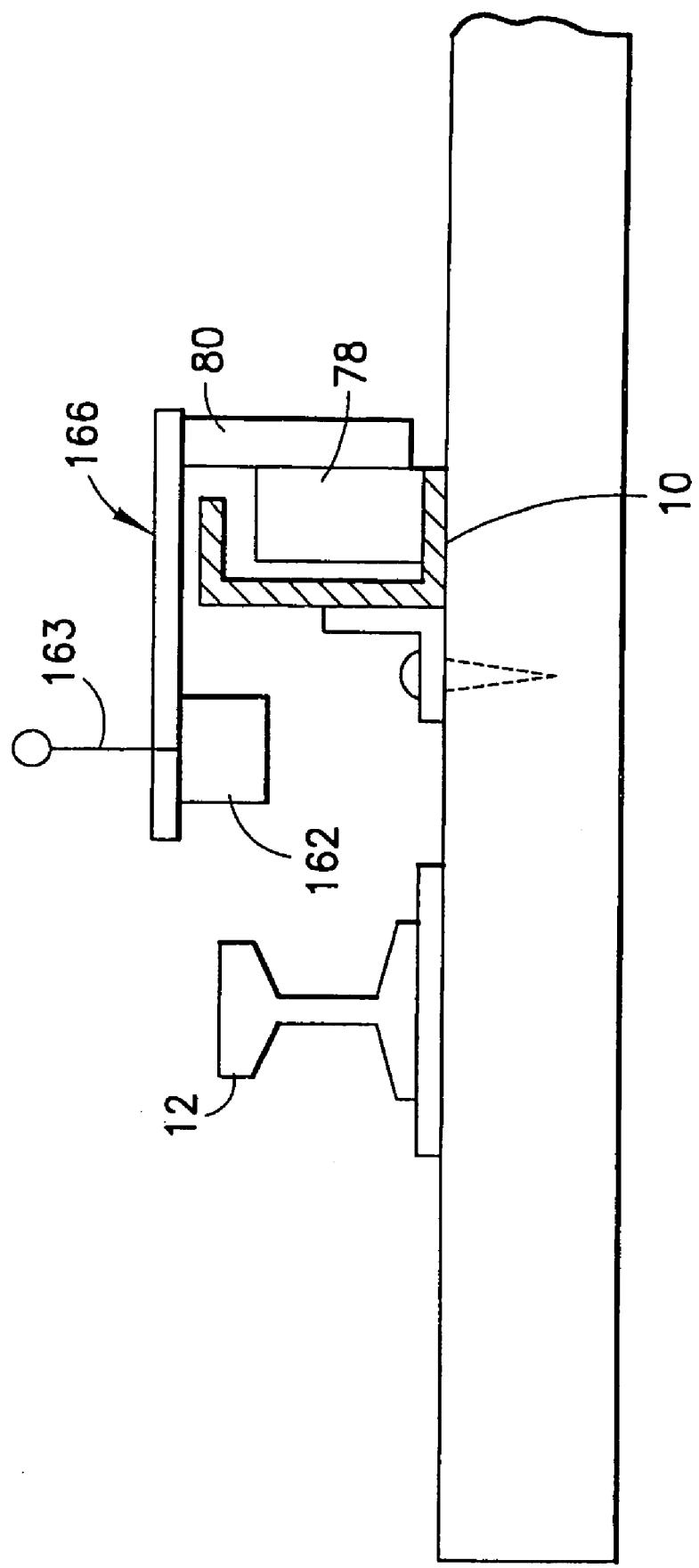
FIG. 15 is an end elevational view, taken along line 15—15 shown in FIG. 14.

As shown in FIG. 1B, connected to the last hydraulic cylinder 26 in the series of cylinders 18, there is disposed a carriage assembly 36. The carriage assembly 36 is preferably in the form of a rectangular structure and is disposed between the guide tracks of the guide way 10. The carriage assembly 36 is equipped with wheels 78 and 82 (See FIG. 4) which ride within recesses provided within the guide tracks of the guide way 10. Disposed on the guide tracks of the guide way 10 are a set of limit or proximity switches 38–44. More particularly, on one side of the guide way 10, progressing away from the direction of the reverse travel end 28 of the guide way 10 (as shown in FIG. 1B), an end travel limit or proximity switch 38, a wheel detector limit or proximity switch 40, and a creep limit or proximity switch 42 are preferably disposed. Directly opposite this series of three switches 38–42, on the other side of the guide way 10, a wheel clear limit or proximity switch 44 is located. A track-side transmitting/receiving radio 45 enclosed in an electrical junction box 46 is used to send signals and control the carriage assembly 36 from a main control unit 224 (see FIG. 17), as discussed further herein. One preferred embodiment of the invention includes a retractable wheel stop 48, located on one rail 12, between the end travel proximity switch 38 and the reverse travel end 28 (as shown in FIG. 1B) of the guide way 10. Preferably, the carriage assembly 36 includes an antenna 163 (see FIG. 15) for transmitting signals to and receiving control signals from the track-side transmitting radio 45 and, thus, the carriage assembly 36 is in communication with and controlled by the main control unit 224.

Figure 1C:
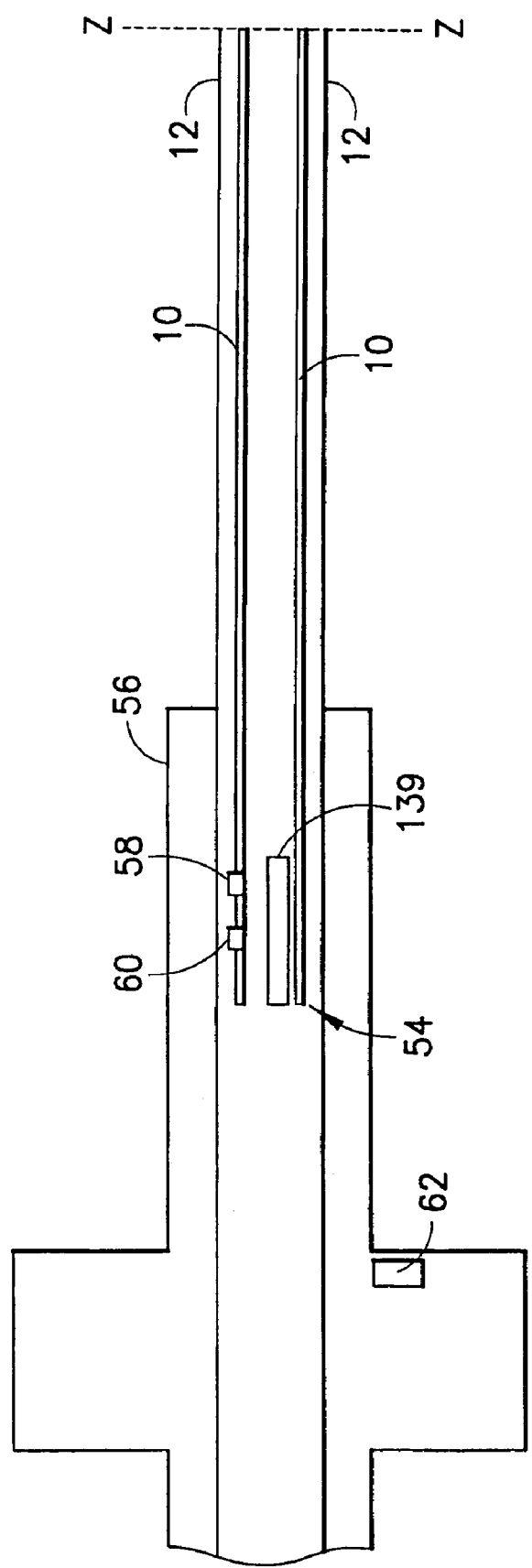

Referring now to FIG. 1C, the end of the guide way 10 shown there will be referred to herein as the forward travel end 54 of the guide way 10. The forward travel end 54 of the guide way 10 is preferably located in a railroad car loading shed 56. Towards the forward travel end 54 of the guide way 10, a creep limit or proximity switch 58 and an end travel limit or proximity switch 60 are preferably located. Additionally, an operator's panel 62, which has connectors which preferably control the entire apparatus, may be located as shown near the forward travel end 54 of the guide way 10.

Figure 2:
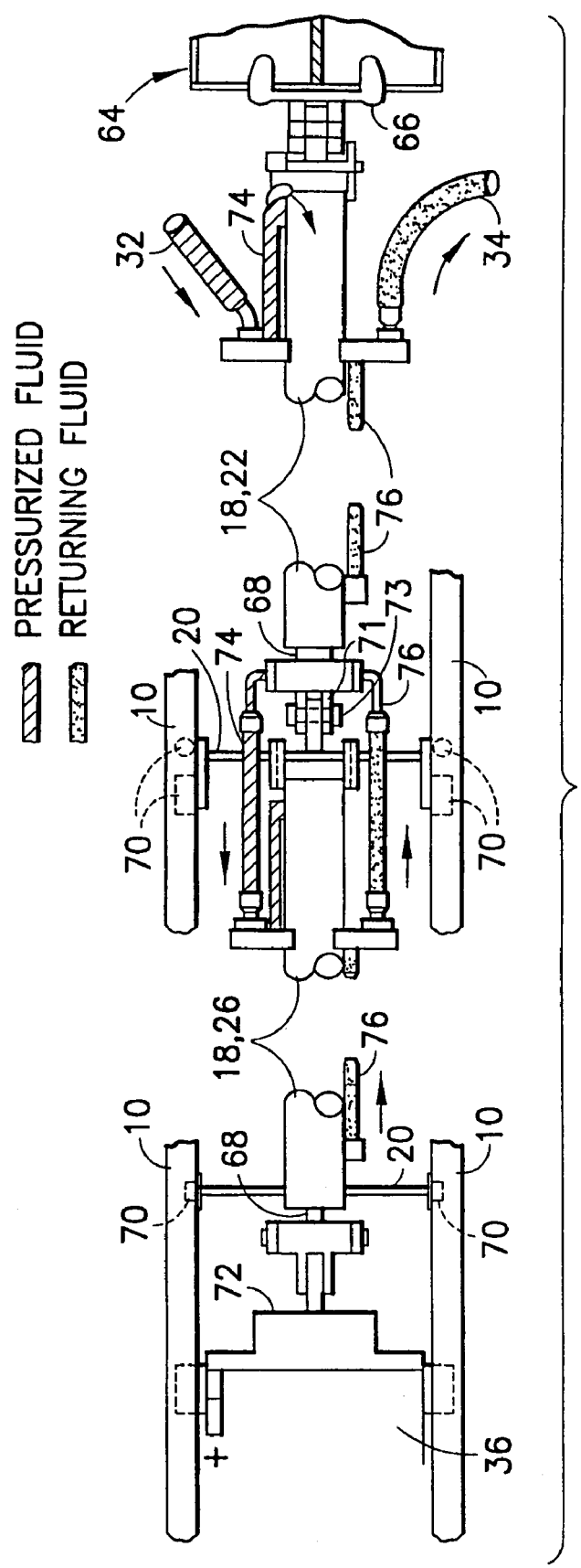
FIG. 2 is a partial plan view of a linear system of hydraulic power cylinders, which also depicts the flow of hydraulic fluid required for forward motion of a carriage assembly disposed at the end of the system of cylinders.
Figure 3:
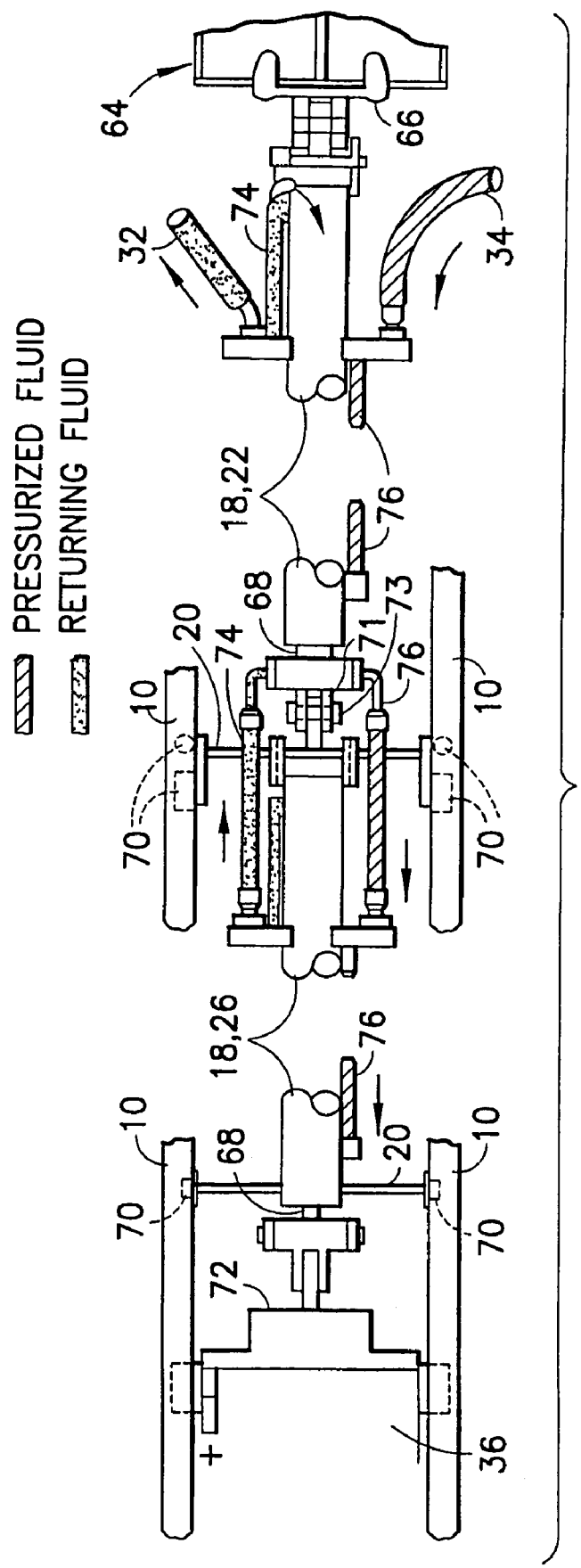
FIG. 3 is substantially the same view as FIG. 2, but which also depicts the flow of hydraulic fluid required for reverse motion of the carriage assembly.

FIGS. 2 and 3 provide a more detailed view of the series of hydraulic cylinders 18. A fixed anchor plate 64, disposed between the railroad track rails 12, has a connection bracket 66 on which the first hydraulic cylinder 22, herein referred to as the anchor hydraulic cylinder, is pin-mounted. Preferably, originating from an intermediate point along the anchor hydraulic cylinder 22 are the hydraulic fluid connections 32 and 34 leading to the hydraulic power source 30 shown in FIG. 1A. The anchor hydraulic cylinder 22, as well as the other cylinders 18, is provided with a piston rod 68.

Preferably, connected in series with the anchor hydraulic cylinder 22, is at least one other hydraulic cylinder 26 of similar construction. The anchor hydraulic cylinder 22 and the at least one other hydraulic cylinder 26, are preferably interconnected by guide roller brackets 20, which brackets have holes 71 with pins 73 inserted therein. The roller brackets 20 span the width of the guide way 10 and preferably include horizontal and vertical rollers 70 on either side. The rollers 70 are set into the recesses of the guide way 10 in order to permit longitudinal movement of the series of cylinders 18 within the rails 12 (See FIG. 1A). The at least one other hydraulic cylinder 18 is also provided with a piston rod 68.

In an embodiment wherein more than two hydraulic cylinders 18 are employed, the cylinder located furthest from the anchor cylinder 22 is the last cylinder. For purposes of illustration, this last cylinder will be herein referred to as the carriage cylinder 26. The carriage cylinder 26 is preferably connected to a previous intermediate cylinder 24 by means of one of the guide roller brackets 20 (see FIG. 1B). Additionally, the carriage cylinder 26 is preferably connected to the carriage assembly 36 by being pin-mounted on a bracket 72.

The system of piping for transporting hydraulic fluid for the extension and retraction of the hydraulic cylinders 18 is also illustrated in FIGS. 2 and 3. As used herein, the "blind end" of each hydraulic cylinder 18 shall be defined as that end located or oriented towards the anchor plate 64. Likewise, the "rod end" of each hydraulic cylinder 18 shall be defined as that end located or oriented towards the carriage assembly 36.

The blind end fluid connection 32 and the rod end fluid connection 34 are routed from the hydraulic fluid source 30 to the anchor cylinder 22. On one side of the series of cylinders 18, a series of blind end hoses 74 distributes hydraulic fluid to the blind end of each hydraulic cylinder 18. Likewise, a set of rod end hoses 76, along the opposite side of the cylinders 18, delivers hydraulic fluid to the rod end, that is, the end where the rod emerges, of each cylinder 18.

FIG. 2 illustrates the hydraulic fluid flow which actuates forward motion, which motion is defined in the drawing, by means of the delivery of pressurized hydraulic fluid through the blind end hoses 74 and the return of fluid through the rod end hoses 76. Conversely, FIG. 3 illustrates the actuation of reverse motion, which motion is also defined by an arrow in the drawing, by means of the delivery of pressurized fluid through the rod end hoses 76 and the return of fluid through the blind end hoses 74.

Figure 4:
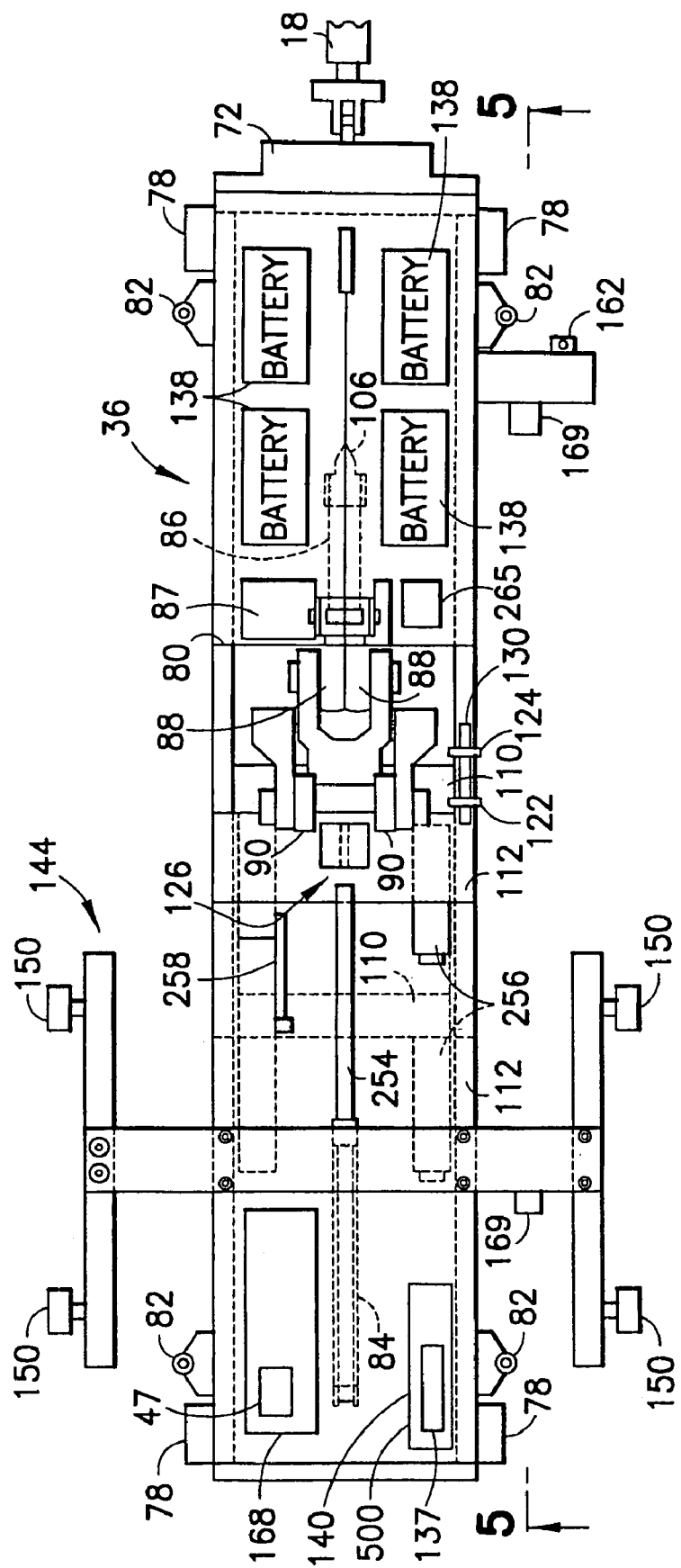
FIG. 4 is a plan view of a carriage assembly utilized in the present invention, wherein axle dogs provided thereon are shown in a fully raised position, and wherein a lock bar provided thereon is shown in a locked position.
Figure 5:
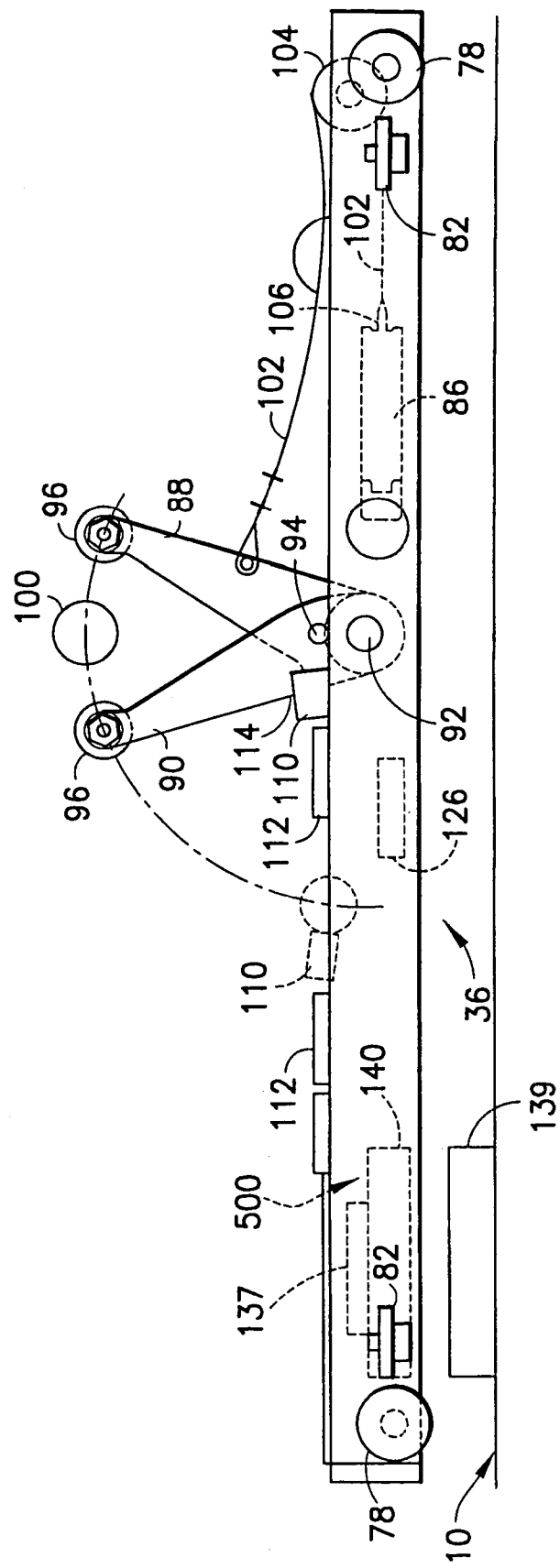
FIG. 5 is an elevational view of the carriage assembly of FIG. 4, taken along line 5—5, wherein the axle dogs are shown in their fully raised position.

Referring now to FIGS. 4 and 5, the carriage assembly 36 includes a structural frame supported by four preferably vertically mounted wheels 78, for movement along the guide way 10 (See FIG. 1B). One wheel 78 is positioned at each end of provided carriage side bars 80. The side bars 80 also bear thereon four additional horizontally mounted wheels 82, for guidance of the carriage within the guide way 10, wherein one horizontal wheel 82 is mounted adjacent to each wheel 78. As used herein, the forward end of the carriage assembly 36 shall be defined as that end lacking an interconnecting hydraulic cylinder 18. Likewise, the reverse end of the carriage assembly 36 shall be defined as that end to which a hydraulic cylinder 18 is interconnected. It will be understood that the "forward end" and "reverse end" of the carriage assembly 36 are correspondingly oriented towards the forward travel end 54 and the reverse travel end 28, respectively, of the guide way 10 (as shown in FIGS. 1C and 1A, respectively).

On the frame of the carriage assembly 36 are pusher dogs 88 and 90, as shown in FIGS. 4–8, which dogs are preferably mounted on a single axle. The single axle pusher dogs consist of a pair of forward dogs 88 and a pair of reverse dogs 90.

As shown in FIG. 5, both pairs of dogs 88 and 90 are pivotally mounted to the carriage assembly 36 near the center thereof by means of a rod 92, and are disposed to pivot about this rod 92. Additionally, a holding pin 94 is disposed above the rod 92, which interconnects the dogs 88 and 90 in such a way that it causes the forward dogs 88 to pivot independently of the reverse dogs 90 up to a certain angle of separation between the forward dogs 88 and the reverse dogs 90, this aspect of the invention being discussed more fully below. The extending end of each of the forward dogs 88 and the reverse dogs 90 is preferably equipped with a rotatably mounted roller 96.

In FIG. 5, the dogs 88 and 90 are shown in a fully raised position, flanking a railcar axle 100. As shown, a cable 102 runs from an intermediate point along the forward dogs 88, around a guide wheel 104 mounted on the reverse end of the carriage assembly 36, and hence to a piston rod 106 of a reverse end electrical cylinder 86, or alternatively a wire rope winch 87 (See FIG. 4). The piston rod 106 and electrical cylinder 86 or the wire rope winch 87 are preferably mounted within the carriage frame between the axle dogs 88 and 90 and the guide wheel 104.

Figure 6:
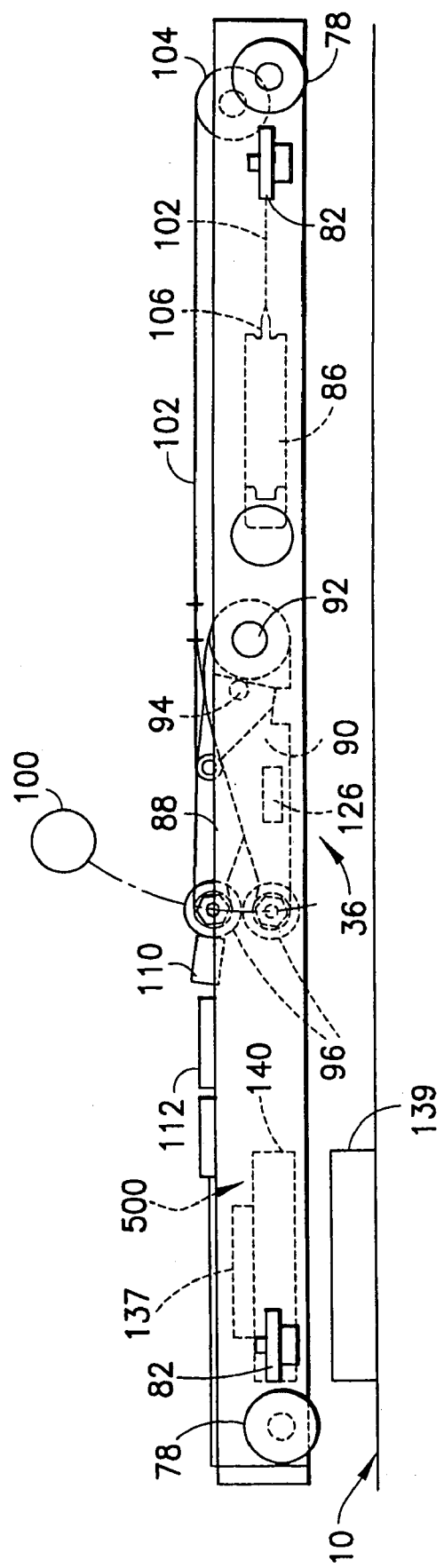
FIG. 6 is substantially the same view as FIG. 5, but showing the carriage assembly with the axle dogs in a fully lowered position, and also showing the lock bar in an unlocked position.

In FIG. 6, the axle pusher dogs 88 and 90 are shown in a fully lowered position within the carriage assembly 36. In this position, the reverse dogs 90 lie substantially horizontally along the bottom of the carriage assembly 36 and the forward dogs 88 lie collapsed on top of the reverse dogs 90. In other words, the forward dogs 88 and the reverse dogs 90 are only minimally separated from each other and occupy a relatively compact space within the structure of the carriage assembly 36. This compact arrangement of the dogs 88 and 90 gives the carriage assembly 36 a very low profile, thereby allowing for free, unhindered passage of the carriage assembly 36 below the railroad car axles 100 and any protruding railroad car hopper attachments which may be present in the working environment.

Figure 7:
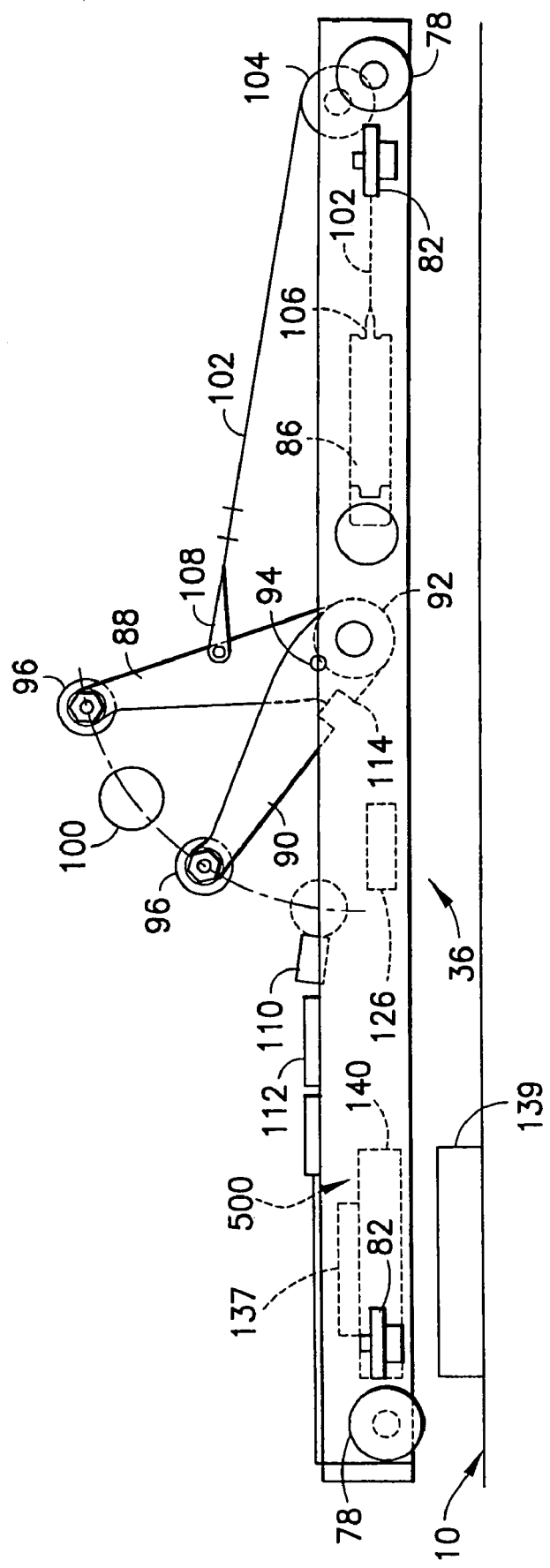
FIG. 7 is substantially the same view as FIGS. 5 and 6, but showing the carriage assembly with the axle dogs in an intermediate position between the fully raised and fully lowered positions of FIGS. 5 and 6, respectively.

In FIG. 7, the axle pusher dogs 88 and 90 are shown in an intermediate position, in which the dogs 88 and 90 are not fully raised. It may be seen that, in this position, the forward dogs 88 are preferably at a level substantially as high as or slightly above the axle 100 and the reverse dogs 90 are preferably at a level below that of the axle 100.

Figure 8:
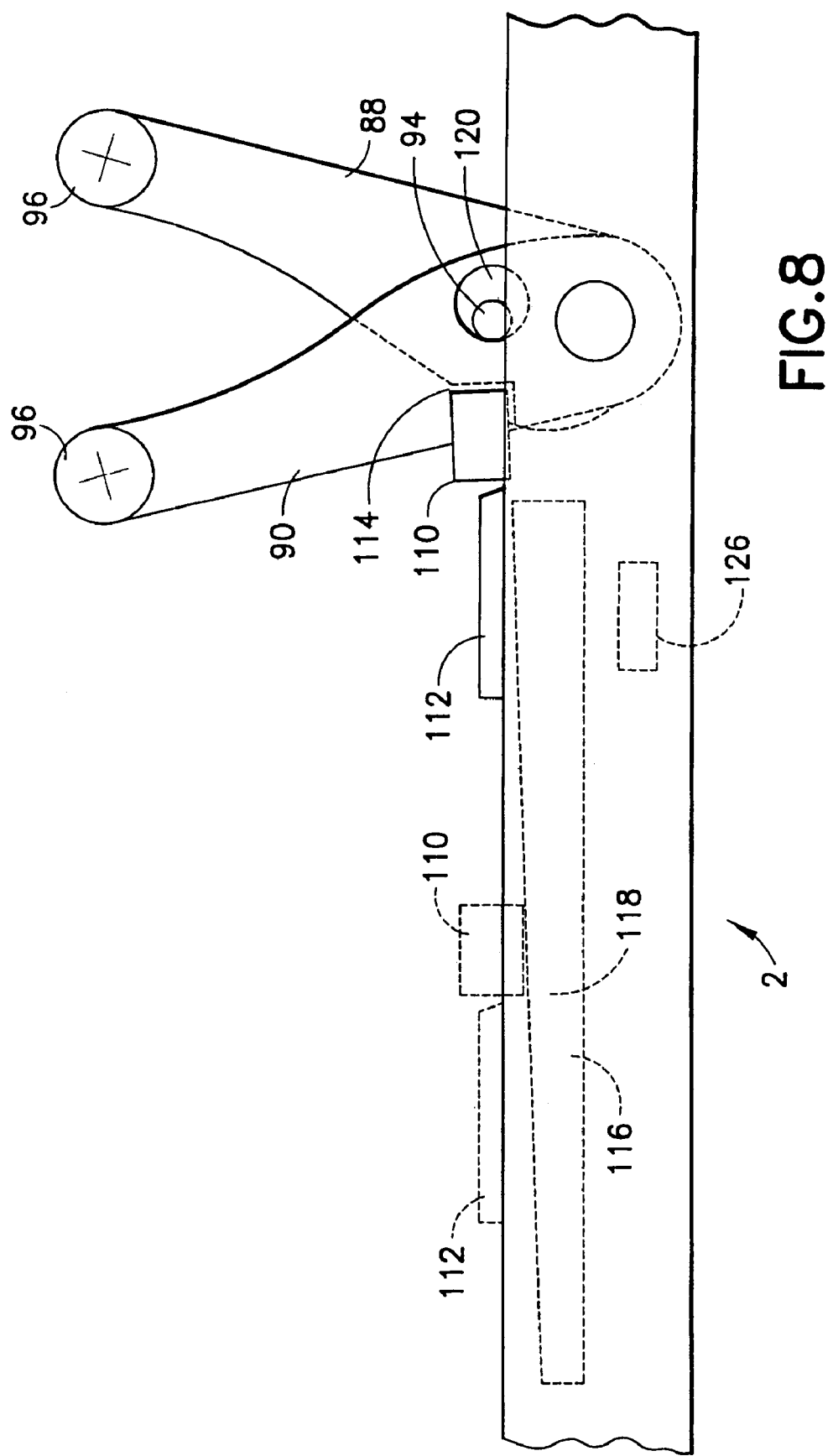
FIG. 8 is an enlarged partial elevational view of the carriage assembly shown in FIG. 4.
Figure 11:
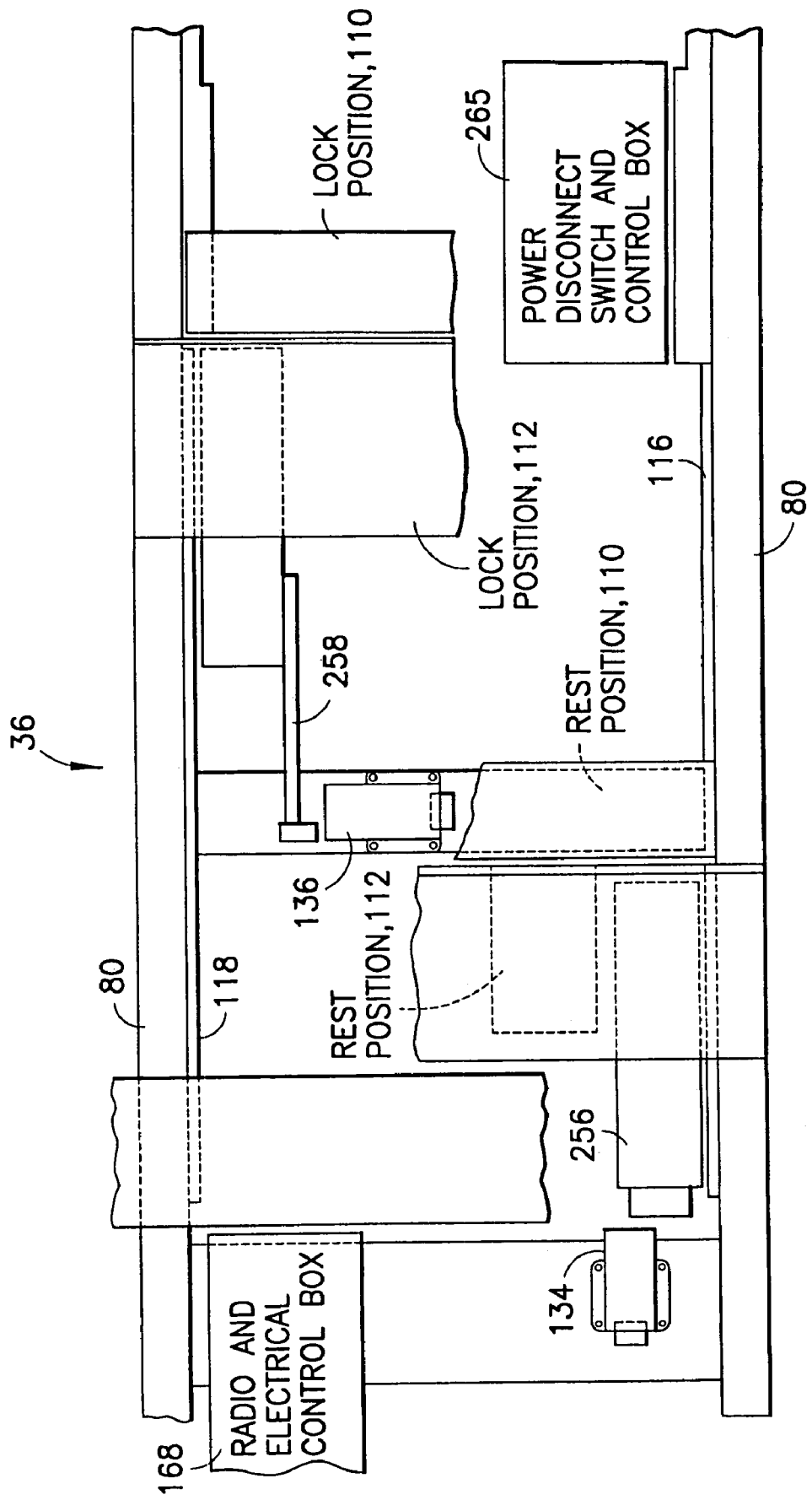
FIG. 11 is an enlarged plan view of a front portion of the carriage assembly, showing a set of lock bar position sensors, a radio, electrical control box of the carriage assembly, and a power disconnect switch and control box.

FIG. 8 is an enlarged elevational view, wherein the dogs 88 and 90 are shown again in their fully raised position. Also illustrated in FIG. 8 is a preferred arrangement of a lock bar 110 and a locking slide 112 connected to the electrical cylinder 84, as shown in FIG. 4. The lock bar 110, sitting in a notch 114 at the base of the reverse dogs 90, supports the dogs 88 and 90 while the dogs 88 and 90 are in their fully raised position. When the dogs 88 and 90 are not in the fully raised position illustrated in FIGS. 6 and 7, the lock bar 110 is disposed in a horizontal position some distance away from the dogs 88 and 90. A ramp 116 is provided on the carriage assembly 36, which is preferably located alongside the carriage assembly 36 and which is situated so as to guide the movement of the lock bar 110. As shown in FIG. 11, a substantially similar ramp 118 is disposed substantially opposite the ramp 116 and on the opposite side of the carriage assembly 36.

FIG. 8 also shows, in greater detail, the interconnection between the forward dogs 88 and the reverse dogs 90. As shown, the holding pin 94 is disposed within a hole 120. The hole 120 passes through both pairs of dogs 88 and 90 and is of a greater diameter in the reverse dogs 90 than that of the holding pin 94. As discussed more fully below, this construction permits first the raising of the forward dog 88, followed by a subsequent raising of the reverse dog 90.

Figure 9:
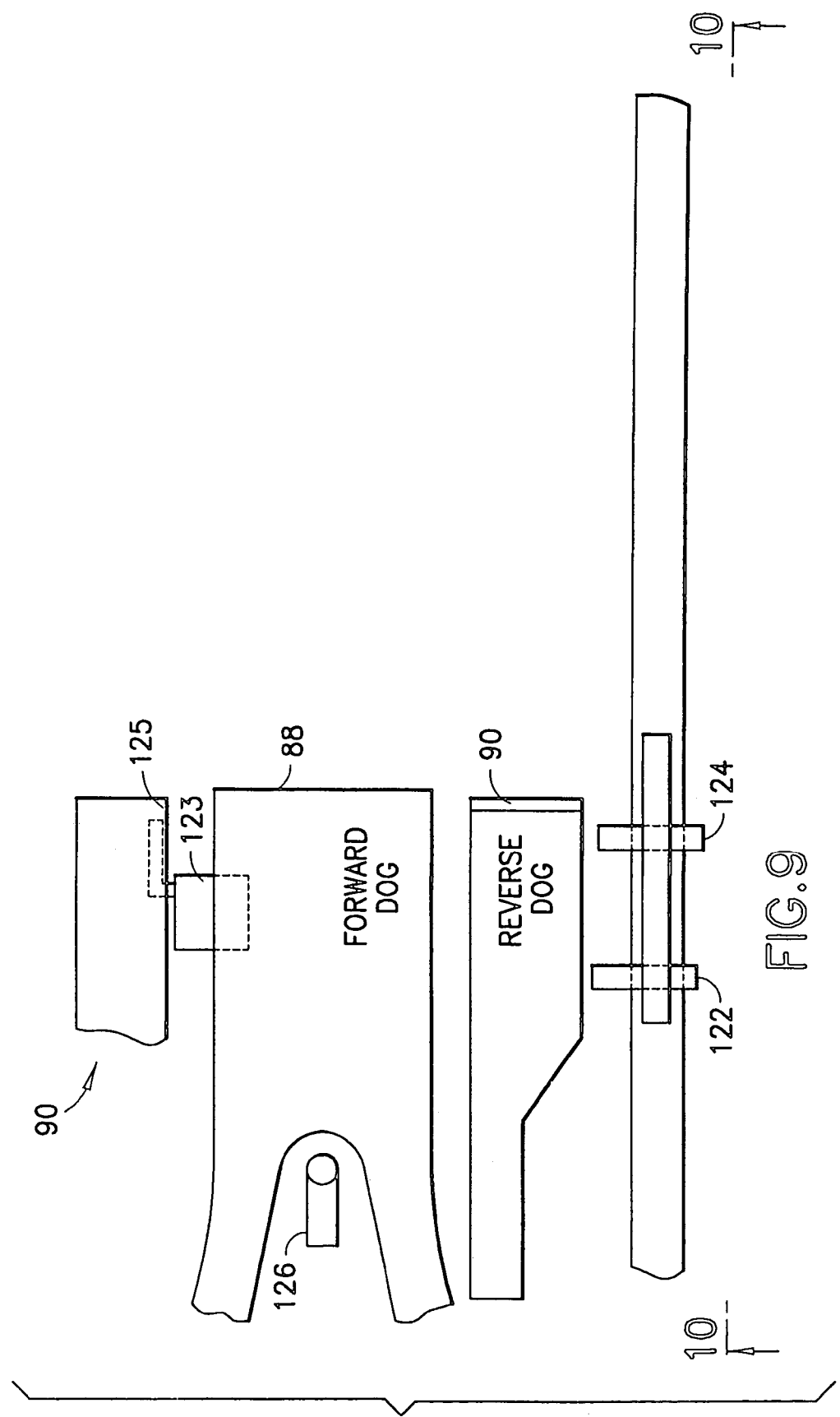
FIG. 9 is an enlarged plan view of a rear portion of the carriage assembly.

Referring now to FIG. 9, position limit or proximity switches 122, 126, and 124 are preferably provided for determining the position of the axle dogs 88 and 90.

Figure 10:
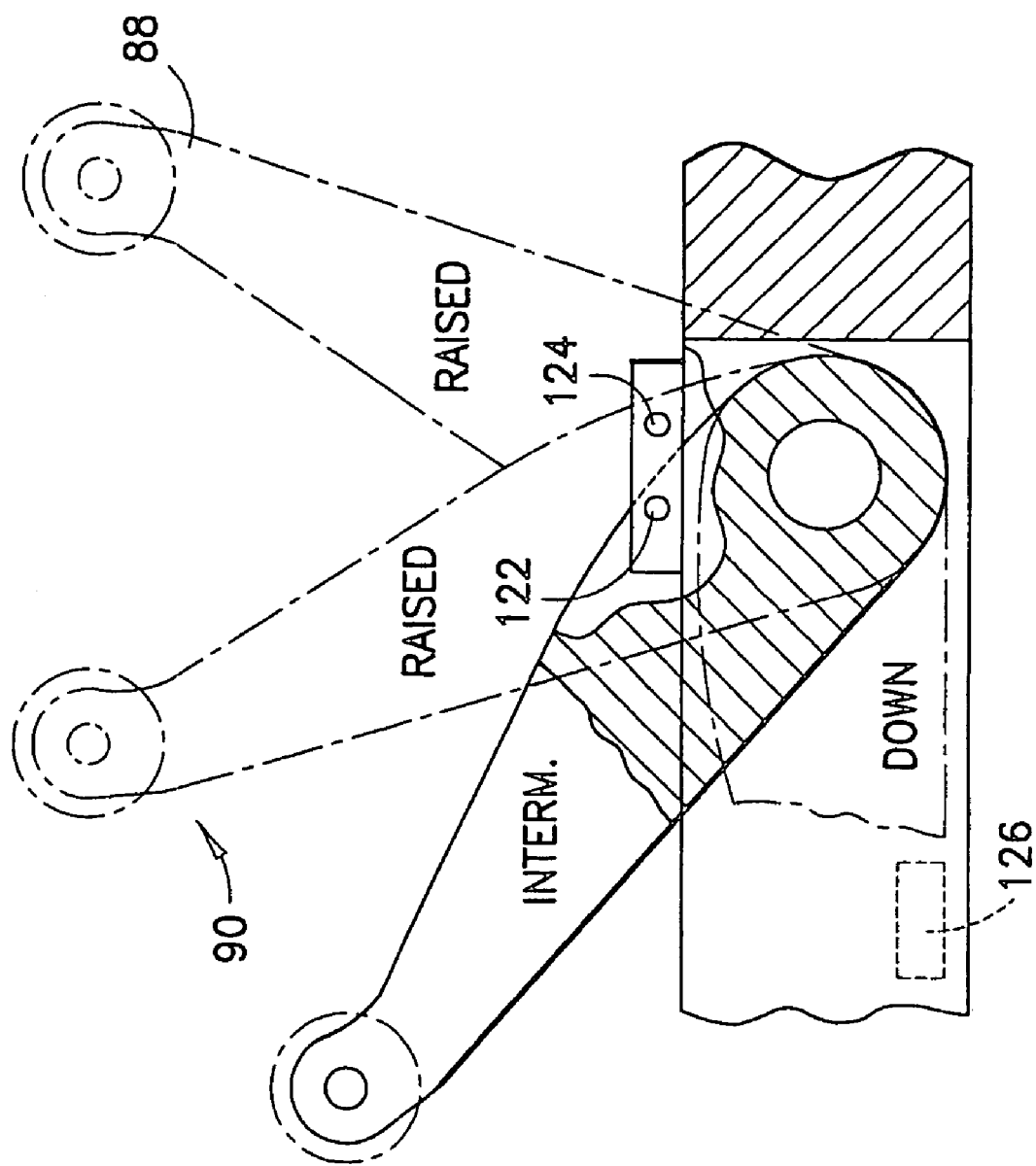
FIG. 10 is an enlarged partial elevational view taken along line 10—10 of FIG. 9.

FIG. 10 shows, in elevational view, the limit or proximity switches 122 and 124 of FIG. 9.

As shown in FIG. 11, position limit or proximity switches 134 and 136 are preferably provided for determining the position of the lock bar 110. The proximity switches 134 and 136 are positioned on the carriage assembly 36, directly underneath the level of the path of travel of the lock bar 110. Similar proximity switches to proximity switches 134 and 136 may be included as part of the electrical cylinder 84.

Figure 12:
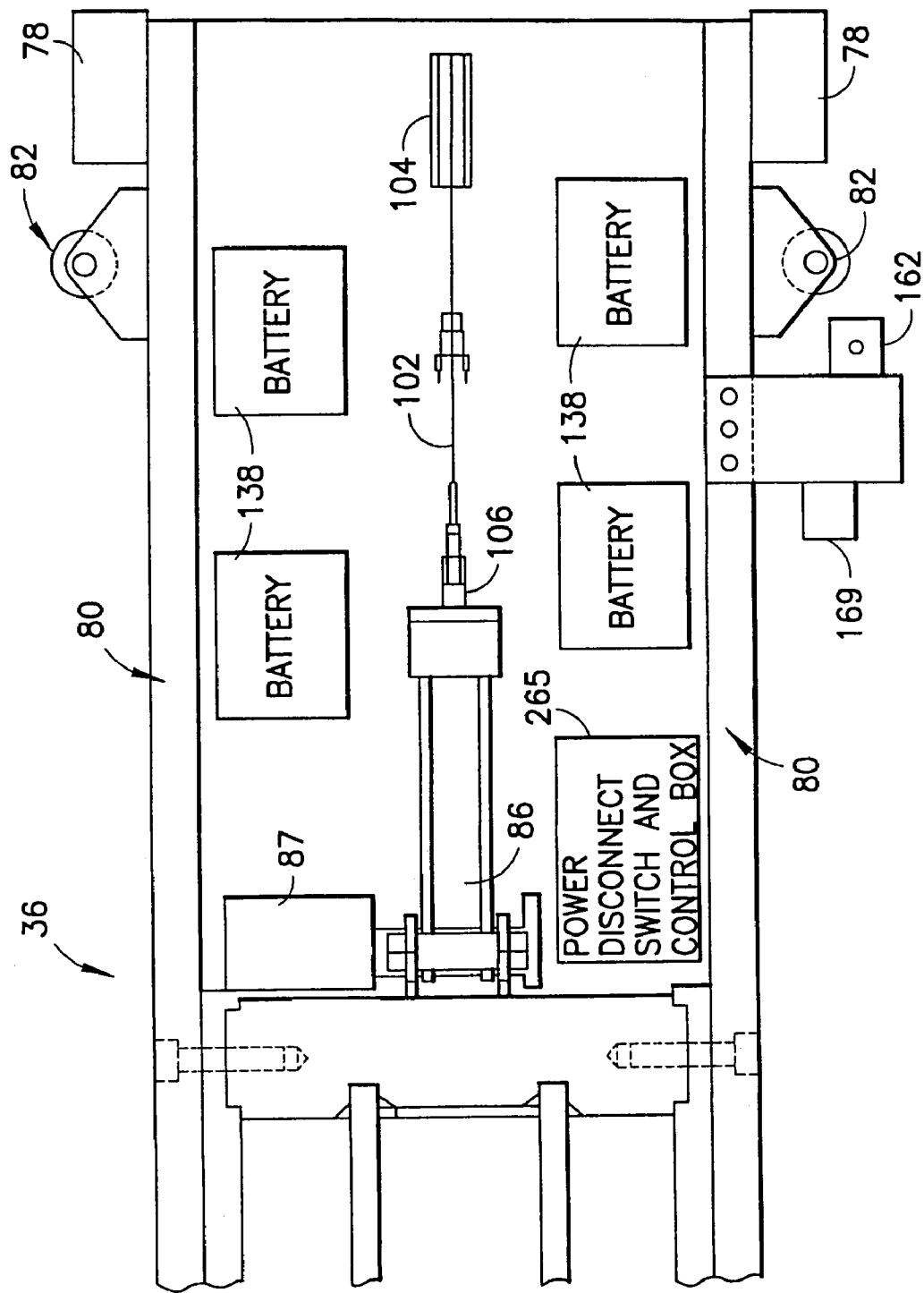
FIG. 12 is an enlarged plan view of a rear portion of the carriage assembly, showing an electric cylinder and batteries provided thereon.

FIG. 12 shows batteries 138 adapted to power the electrical cylinders 86 and 84, and which are preferably positioned at the reverse end of the carriage assembly 36. The batteries 138 further power a carriage assembly radio transmitter/receiver 47 onboard the carriage assembly 36 as well as the proximity switches 122, 126, 124 shown in FIG. 9. The batteries 138 preferably include four (4) individual batteries, such as 12V DC, 80aH batteries that are wired in series-parallel fashion and develop 24V DC. Alternatively, different numbers of the batteries 138 in different configurations to produce different voltages may be used, as desired, as will be appreciated by those skilled in the art.

Figure 13:
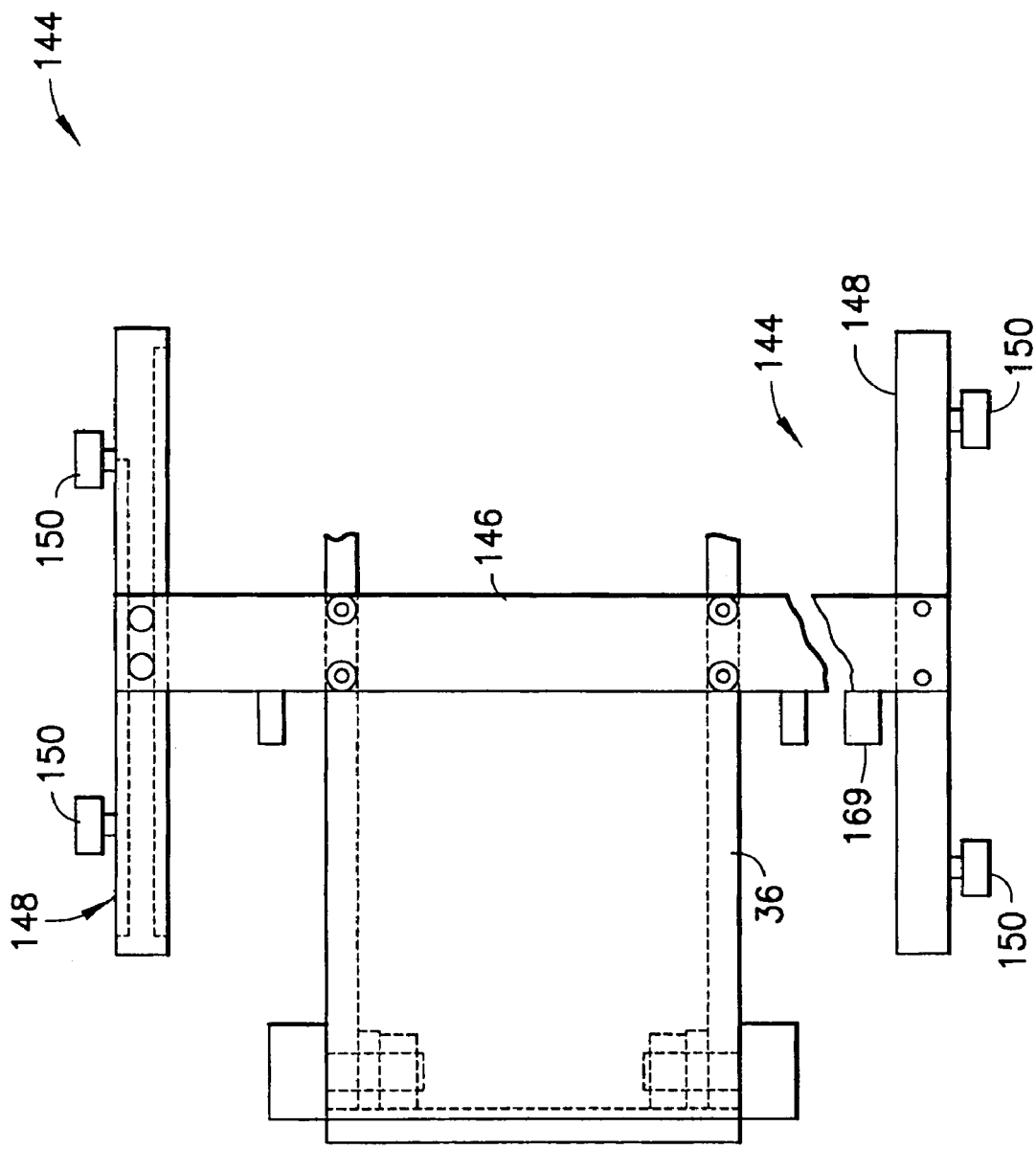
FIG. 13 is a plan view of a front portion of the carriage assembly, showing a wheel counting assembly provided thereon.
Figure 14:
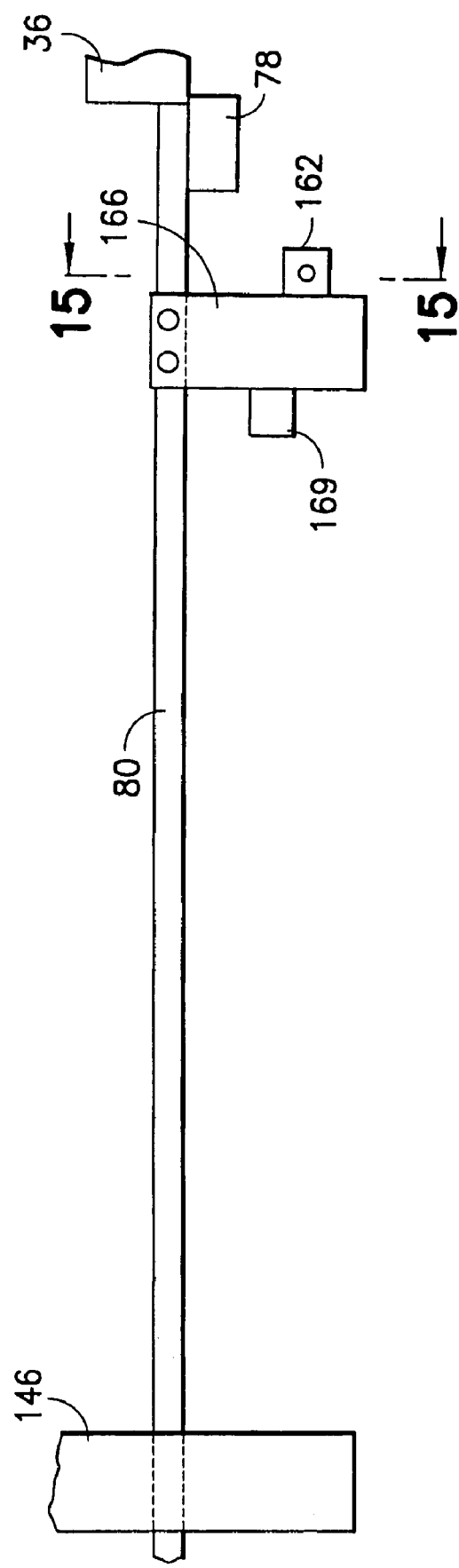
FIG. 14 is a partial plan view of the carriage assembly, showing an antenna enclosure and a charging plug provided thereon.

As shown in FIG. 13, a railroad car wheel counting assembly 144 extends outwardly from the forward end of the carriage 36 on both ends of a crossbar 146. The assembly 144 preferably includes a protection cover 148, which cover is disposed perpendicular to the cross bar 146. The counting assembly 144 preferably comprises four (4) proximity switches 150, as illustrated. Also positioned at one corner of carriage assembly 36, as shown in FIG. 14, is an antenna enclosure 162, which houses a radio antenna 163 (See FIG. 15). The carriage assembly radio 47 and all electrical controls necessary to operate and control the dogs 88, 90, lock bar assembly 110, 112, and limit switches on the carriage assembly 36 are contained in an electrical control box 168 (or, alternatively, several electrical control boxes). Power is provided to the electrical control box 168 from the batteries 138 via a conventional electrical conduit. All proximity switch connections (i.e., switches 122, 123, 124, 134, 136, 150), relays, and controls necessary to operate electrical cylinders 84, 86 and control the carriage assembly 36 are provided in the electrical control box 168. An electrical conduit provides an electrical connection between the antenna enclosure 162, electrical control box 168, and switch 265, as discussed further herein. The carriage assembly 36 with the batteries 138 and radio housed in the electrical control box 168 is completely independent of wires previously used to connect the carriage assembly 36 to an external power source. The carriage assembly 36, the batteries 138, and radio contained in the electrical control box 168 communicate via radio signals to a main control unit 224, as discussed herein. Preferably, the power level of the batteries 138 is monitored on the carriage assembly 36 and a light may be illuminated on the main control unit 224 when the batteries 138 require recharging. The power level of the batteries 138 is monitored by the electrical control box 168 mounted on the carriage assembly 36. Recharging the batteries 138 will be necessary when a signal is transmitted from the carriage assembly 36, which illuminates a light on the main control unit 224, as indicated previously.

The batteries 138 may be recharged by a recharging device 139 mounted on the guide way 10, such as a contactless power transfer device or system 500 which transfers power from a primary or stator coil, which may form the recharging device 139, located at a stationary point on the ground (i.e., on the guide way 10) to a secondary coil 140 mounted on the carriage assembly 36 and electrically connected to the battery charger 137 located on the carriage assembly 36 without the need for common wires or cables between the secondary coil 140 and primary coil 139 or, alternatively, by a common alternator or generator that can be driven by a contactless magnetic coupling, or alternatively by two charging plugs 169, one at each end of the carriage assembly 36 as discussed further herein. The battery charger 137, secondary coil 140, and recharging device 139 generally form the contactless power transfer system 500 for remotely recharging the batteries 138 without the need for conventional electrical cables for connecting the batteries 138 to a source of electrical power used to recharge the batteries.

After power is transferred to the battery charger 137, the battery charger 137 will communicate power directly to the batteries 138 in a conventional manner. Generally, the recharging device 139 and secondary coil 140 form a contactless power transfer unit that may be similar in concept to what is used in linear induction motors. This present invention encompasses using multiple recharging devices 139 located at one point, as shown in FIG. 1C, or at multiple points located along the guide way 10 to provide power to the battery charger 137 located on carriage assembly 36 without the need for wires or conduits. Alternatively the recharging device 139 could utilize an alternator or generator that preferably has an input shaft that is fitted with one-half of a magnetic coupling. The other half of the magnetic coupling is mounted on a common electric motor that is mounted on the ground in the guide way 10. The electric motor will be positioned so that it will come in proximity to the alternator/generator mounted on the carriage assembly 36. When the carriage assembly 36 is proximate to the electric motor, the electric motor is activated and the torque necessary to rotate the alternator/generator is transmitted via the magnetic couplings (i.e., through the air gap between the magnetic couplings). As indicated, multiple charging positions may be provided along the guide way 10, and the recharging device 139—secondary coil 140—battery charger 137 arrangement described above is not necessarily limited to the railcar engaging and positioning device and carriage assembly 36 described in this disclosure, but may be applied to any electrically-powered vehicle where it may be desirable to remotely charge the vehicle without the use of physical electrical conduits, such as wires or connections.

In general, the battery charger 137, recharging device 139, and secondary coil 140 form the contactless charging system 500, and are similar in concept to a linear induction motor, for transferring the recharging electrical (i.e., inductive) energy through ambient air from the recharging device 139 to the secondary coil 140 and then on to the battery charger 137. The primary or stator (i.e., the recharging device 139) of the linear induction motor is mounted on the guide way 10, as indicated previously, side-up. The secondary or rotor (i.e., the battery charger 137) is mounted upside down on the carriage assembly 36 so that the faces of the primary and secondary are facing each other. Once the secondary (the battery charger 137) on the carriage assembly 36 is moved over top of (i.e., proximate to) the primary (i.e., the recharging device 139), the secondary is preferably preadjusted away from or toward the ground until a preset gap therebetween is set, such as a 7 mm gap. The carriage assembly 36 is free to move back and forth over the primary situated on the guide way 10 during the recharging process. When the carriage assembly 36 moves into a position where the secondary and primary substantially line up over top of one another, additional circuitry on the carriage assembly 36 signals the track-side main control unit 224 that the primary may now be energized and recharging can begin. A single secondary is preferably mounted on the carriage assembly 36 and the primary may be mounted on the track bed of guide way 10 at any desirable position, such as at the home position of the carriage assembly 36. However, as indicated previously, the present invention envisions the use of multiple primaries located at various positions along the guide way 10. This configuration will allow battery recharging at multiple locations along the guide way 10.

Operator's Panel

Figure 16A:
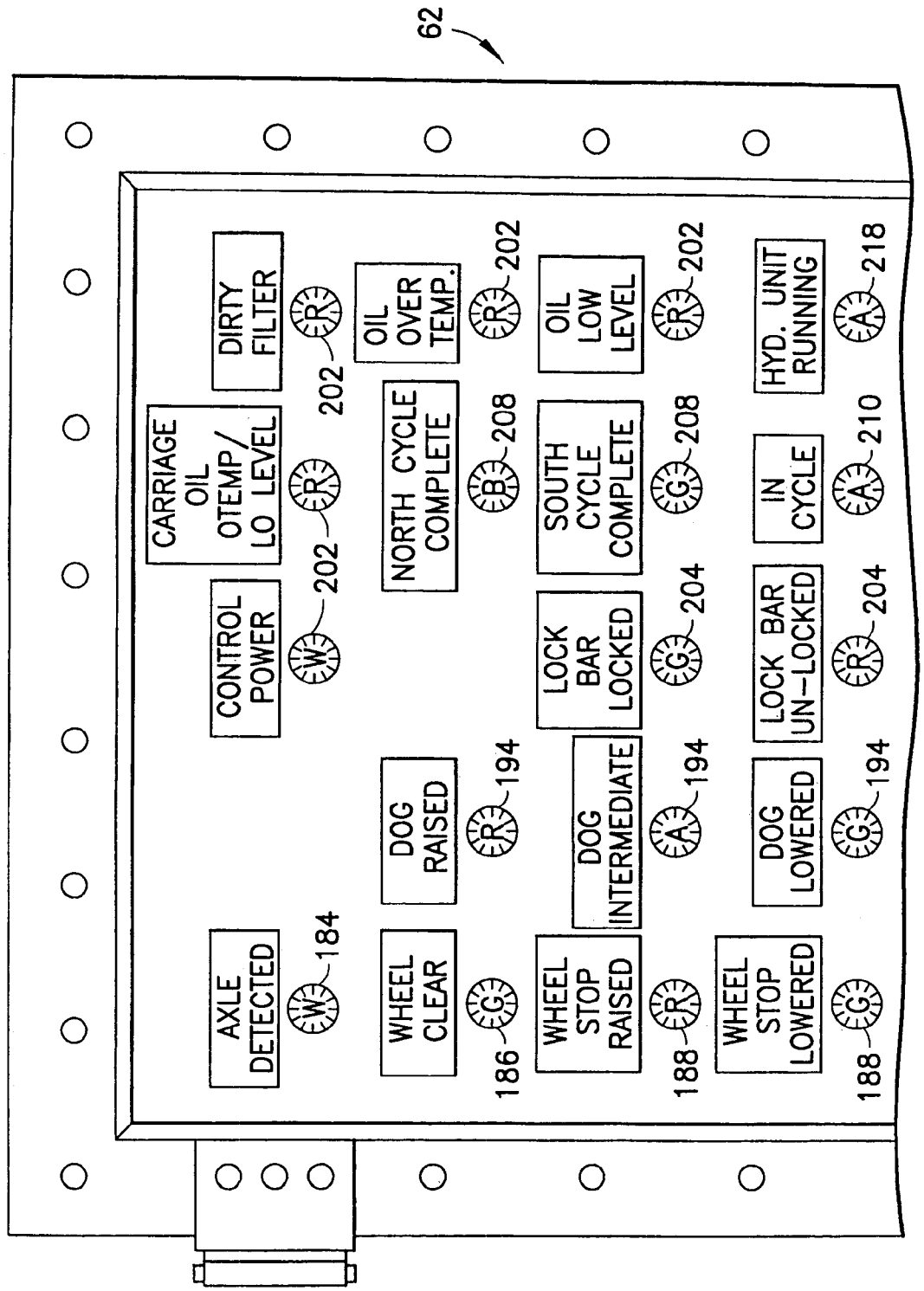
FIGS. 16A, 16B, and 16C are elevational views of successive portions of an operator's panel arrangement.
Figure 16B:
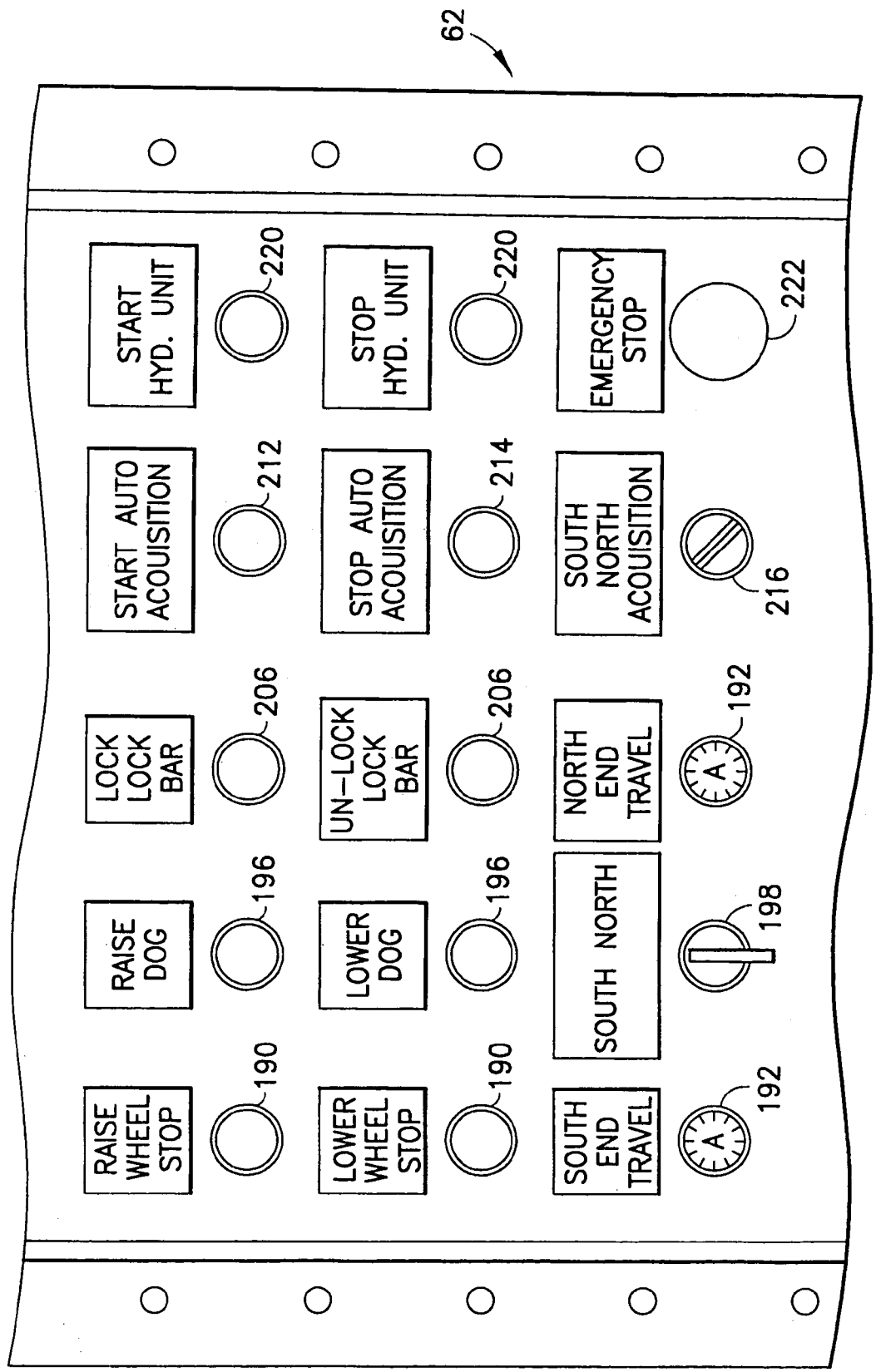
Figure 16C:
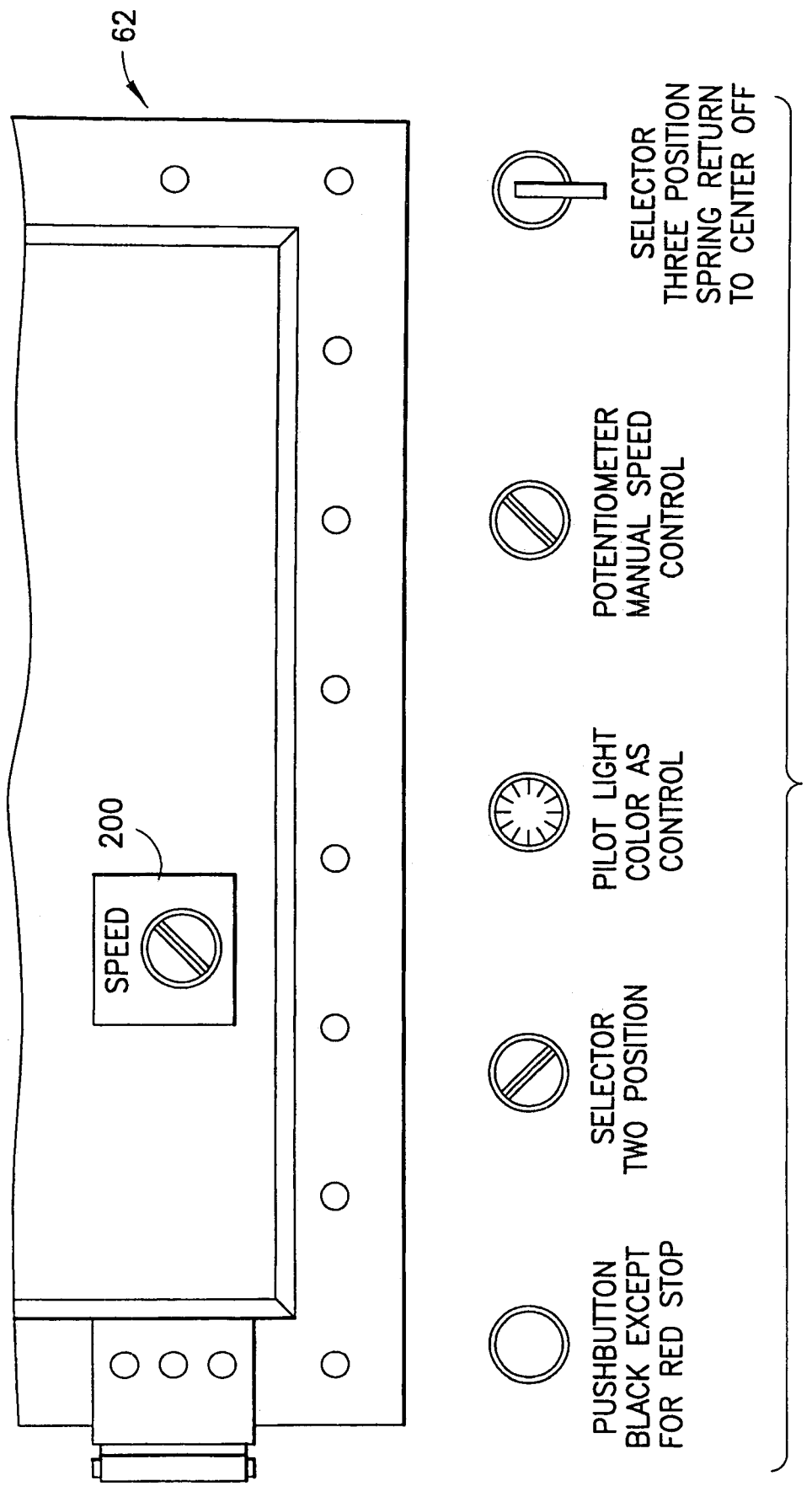

FIGS. 16A, 16B, and 16C show a preferred arrangement of an operator's panel 62, which may be used for both manual and automatic operation of a railroad car positioner according to the present invention. Buttons for manual operation include start and stop buttons 220 for the hydraulic drive unit 30. A control 198, which is preferably in the form of a selector switch, activates forward or reverse travel, and a potentiometer 200 controls the speed of travel. Additionally, the pusher dogs 88 and 90 are raised and lowered by means of buttons 196, and the locking bar assembly 110 and 112 is activated and deactivated by buttons 206. An indicator light 218 indicates activation of the hydraulic power unit, lights 192 indicate when the carriage assembly 36 has reached the limit of its travel in the two opposing directions of travel, and lights 194 and 204 indicate the positional status of the dogs 88 and 90 and the lock bar 112, respectively.

Controls for the automatic acquisition of a railroad car axle include a selector switch 216, for the direction of acquisition, and an acquisition cycle start button 212. Additionally, an acquisition cycle stop switch 214 may be used to interrupt the acquisition cycle at any time. An indicator light 210 indicates activation of the cycle sequence, and indicator lights 208 indicate the completion of a cycle in a particular direction of travel. An indicator light 184 is activated when the wheel counting assembly 144, on the carriage 36, detects a railroad car wheel.

Further, the operator's panel 62 preferably includes indicator lights 202, for indicating the status of the control panel power, the carriage assembly oil level and temperature, the carriage assembly oil filter, and the hydraulic power unit oil level and temperature. A large emergency stop button 222 is preferably provided for shutting down all power. An indicator light 186 illuminates in response to activation of either the wheel clear limit or proximity switch 44 or wheel detector limit or proximity switch 40 as shown in FIG. 1B. Finally, in an embodiment of the invention which includes wheel stops 48 (See FIG. 1B), buttons 190 for the lowering and raising of the wheel stops 48 may be provided, as well as indicator lights 188, for indicating the positional status of the wheel stops 48. All circuitry is appropriately wired from the controls and lights to appropriate parts of the embodiments of the invention described herein, and this circuitry defines appropriate means for carrying out the functions to be performed by the apparatus as described herein.

Control Circuitry

Figure 17:
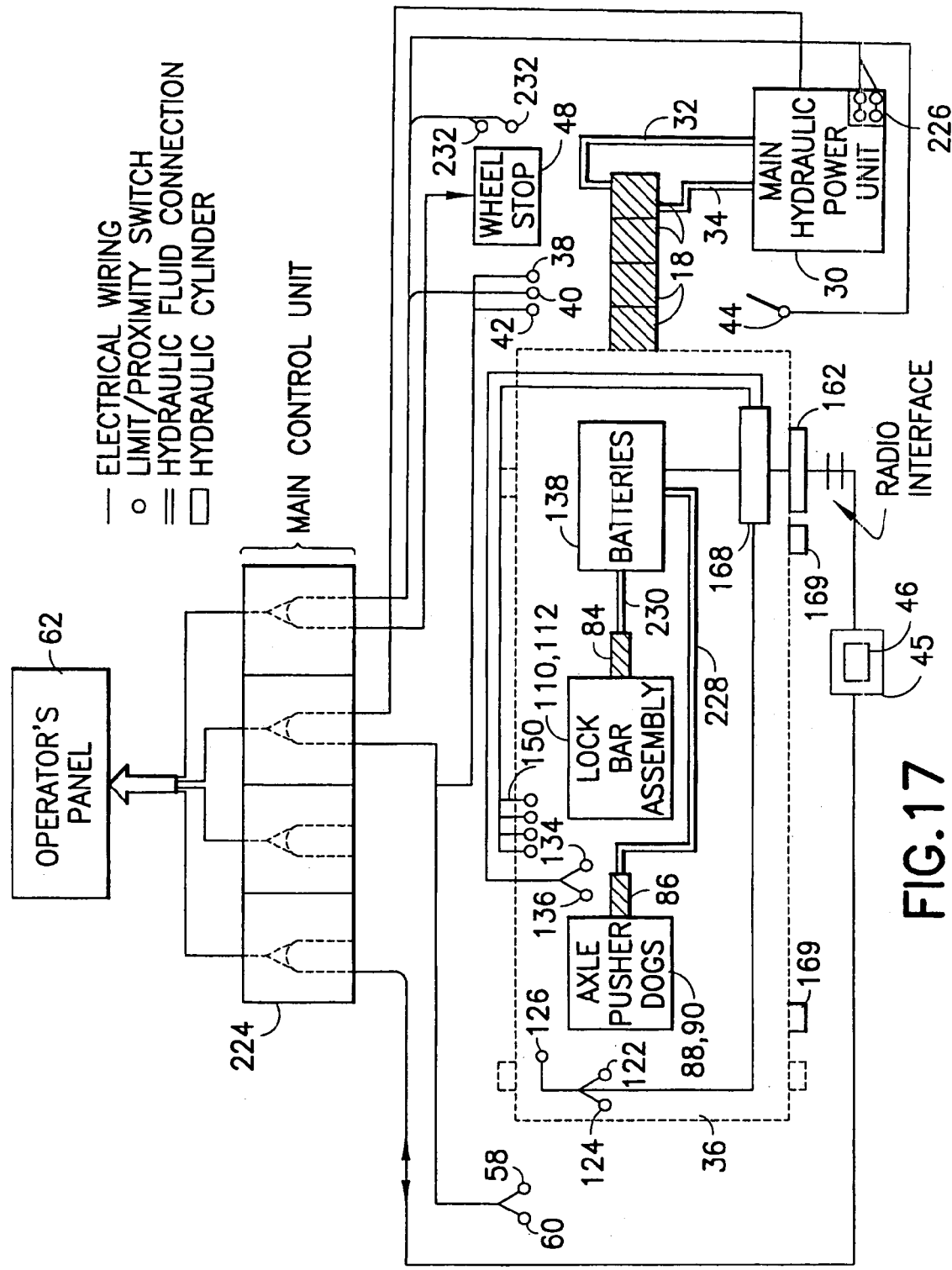
FIG. 17 is a schematic block diagram depicting various components of an electrical control system employed in the present invention.

FIG. 17 is a simplified schematic diagram of the preferred electrical control circuitry and the main hydraulic fluid connections utilized in the present invention. In general, a main control unit 224 serves as a nucleus for the processing, receiving, and transferring of electrical information. Included within the main control unit 224 are motor starters, circuit breakers, and, preferably, an industrial programmable logic controller (or "PLC"). Included within enclosure 46 is trackside radio 45. The operator's panel 62, as mentioned previously, sends commands from the operator in the form of electrical signals to the main control unit 224, whence the signals are processed and routed to the appropriate destinations by hardwire or radio. Conversely, signals sent by hardwire or radio from various sensors throughout the apparatus activate appropriate controls in the main control unit 224, and also activate appropriate indicator lights at the operator's panel 62.

Communication from the main control unit 224 to the hydraulic power unit 30 includes electrical means for starting and stopping the power unit 30, and for controlling the rate and direction of hydraulic fluid flow therefrom or thereto.

The fluid connections 32 and 34 from the power unit 30 to the hydraulic cylinders 18 actuate either forward or reverse motion of the carriage assembly 36. Preferably, at least a pair of limit or proximity switches 226 disposed at various locations within the hydraulic power unit 30 serves to indicate the status of the internal components of the hydraulic power unit 30 by the activation of the appropriate indicator lights 202 on the operator's panel 62, as shown in FIGS. 16A, 16B and 16C, and as was discussed previously. Additionally, the limit or proximity switches 226 provide for a shutting down of the hydraulic power unit 30, in the event that a given control limit, such as the fluid reservoir level, has been exceeded.

The creep limit or proximity switches 42 and 58 provide for deceleration of the carriage assembly 36 by signaling the main control unit 224 and the hydraulic power unit 30 to supply less hydraulic fluid to the hydraulic cylinders 18. Likewise, the end travel limit or proximity switches 38 and 60 are provided to completely stop motion of the carriage assembly 36, by signaling the main control unit 224 and the hydraulic power unit 30 to completely cease supplying the hydraulic cylinders 18 with hydraulic fluid.

Communication from the main control unit 224 to the axle pusher dogs 88 and 90, and to the lock bar assembly 110 and 112, includes radio control for controlling the dogs 88, 90 (i.e., raise), electrical cylinders 84, 86, and proximity switches 122, 126, 124 of the carriage assembly 36, to achieve results similar to those discussed immediately above for the main hydraulic power unit 30. Therefore, the control unit 224, by way of the radio 45 and 47 powered by the batteries 138 and proximity switches 122, 126, 124, is able to control the rate and direction of both electrical cylinders 84, 86 and therefore, then able to actuate motion of the axle dogs 88 and 90 and of the lock bar assembly 110 and 112, respectively, in a manner described in more detail below.

The proximity switches 122, 126, and 124 indicate the positions of the axle dogs 88 and 90, and the proximity switches 134 and 136 indicate the positioning of the lock bar 110. The proximity switches 122, 126, and 124 also serve to stop movement of the axle dogs 88 and 90 and, likewise, the proximity switches 134 and 136 also serve to stop movement of the lock bar assembly 110 and 112.

As mentioned previously, one preferred embodiment of the invention may include at least one retractable wheel stop 48, for preventing any drift of a railroad car. In such a case, communication from the main control unit 224 to the wheel stop 48 preferably includes electrical means for lowering and raising the wheel stop 48. Additionally, position proximity switches 232 are preferably provided to detect the position and cease the movement of the wheel stop 48. The position of the wheel stop 48, as detected by the proximity switches 232, activates the appropriate indicator light 188 on the operator's panel 62 (see FIGS. 16A, 16B and 16C). Further, the wheel detector proximity switch 40, which is situated between the creep proximity switch 42 and the end travel proximity switch 38 at the reverse travel end 28 of the guide way 10 is preferably actuated by a target provided on the carriage assembly 36. Also, the wheel clear proximity switch 44, which is situated on the opposite side of guide way 6 from wheel detector proximity switch 40, is actuated by a railroad car wheel flange, when the carriage assembly 36 is moving a railroad car. Both proximity switches 40 and 44 are used to detect wheel clearance for the wheel stop 48 to be raised or lowered. Either proximity switch 40 or 44, when activated, will illuminate the "wheel clear" indicator light 186 on the operator's panel 62 (see FIGS. 16A, 16B and 16C).

As mentioned above, the control circuitry of the main control unit 224 is programmable. This implies that the control circuitry may be programmed and customized in a way that best suits the needs of the user. In one preferred embodiment, the control circuitry 224 is preferably a "SLC 150" industrial programmable controller.

Operation

In operation of the railroad car positioner according to the present invention, it is first assumed that a string of railroad cars has been positioned on the railroad track such that at least the first car slated for acquisition is located at a point within the travel range of the carriage assembly 36. For manual acquisition of an axle 100, the carriage assembly 36 must first be moved to a position, as shown in FIG. 6, under the axle 100 desired for acquisition. Preferably, the axle 100 desired for acquisition will be either the first or third axle of the railroad car.

Referring now to FIG. 2, if such acquisition requires forward motion of the carriage assembly 36, then a quantity of pressurized fluid is delivered from the hydraulic power unit 30 by way of the fluid connection 32 to the blind end of the anchor cylinder 22. Such fluid delivery actuates outward extension of the piston rod 68 of the anchor cylinder 22.

If acquisition of an axle 100 requires reverse motion of the carriage assembly 36, then, as seen in FIG. 3, a quantity of pressurized fluid is delivered from the hydraulic power unit by way of the fluid connection 34 to the rod end of the anchor cylinder 22. Such fluid delivery then actuates retraction of the piston rod 68 of the anchor cylinder 22.

Figure 18:
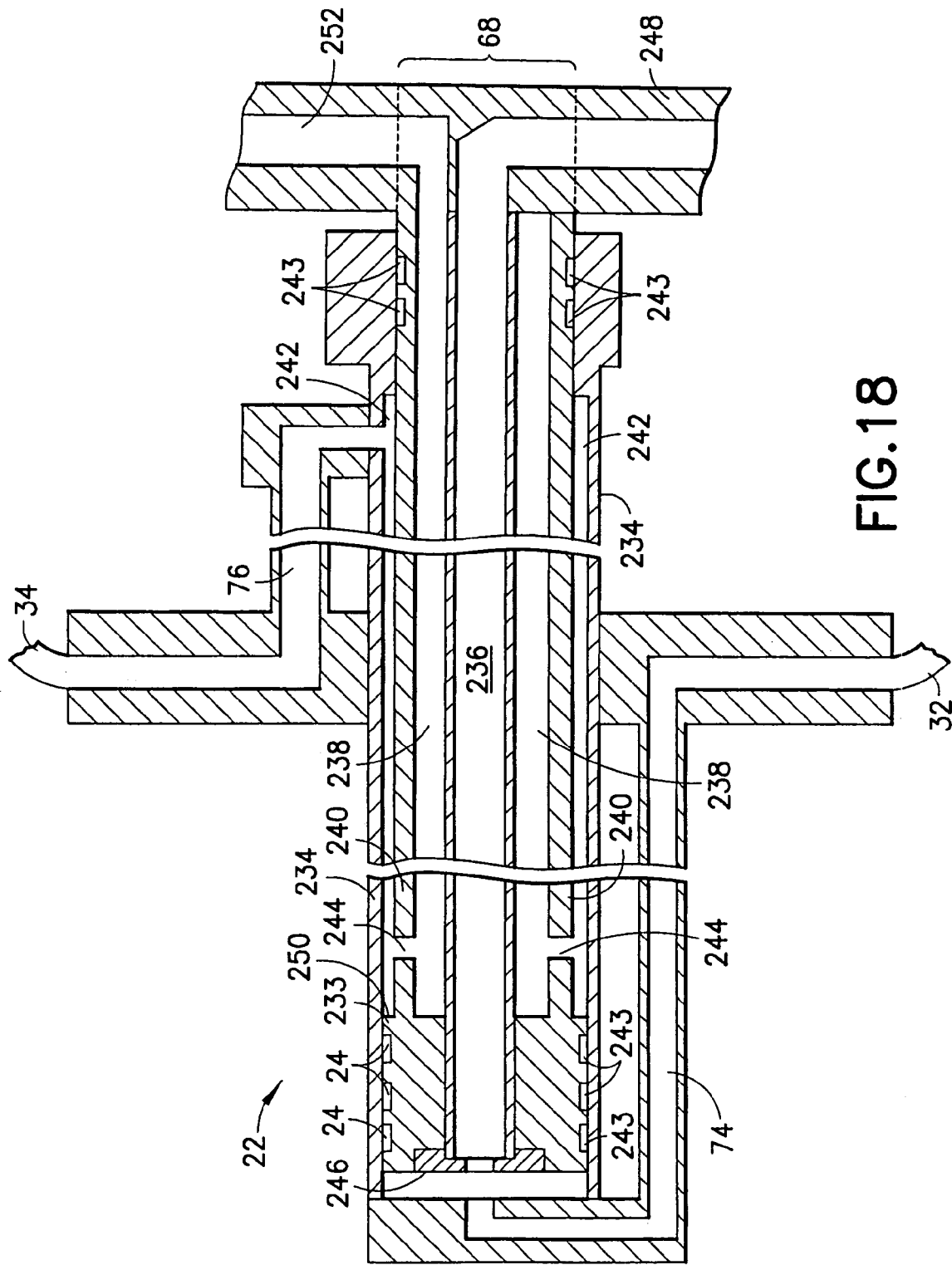
FIG. 18 is a cross-sectional plan view of one of the hydraulic power cylinders of the linear system of hydraulic power cylinders shown in FIG. 2.

Referring now to FIG. 18, it will be seen that one hydraulic cylinder of the series of hydraulic cylinders 18 includes a piston 233 positioned within an outer cylinder wall 234. The piston rod 68 (see FIG. 2) comprises a central cylindrical chamber 236, a concentric annular chamber 238 and an outer wall 240. The space between the piston rod wall 240 and the cylinder wall 234 forms an outer annular chamber 242. A plurality of sealing rings 243 are circumferentially disposed within the outside perimeter of the piston 233. Other sealing rings are disposed about the end of the piston rod wall 240 at the end opposite the piston 233. Finally, at least one orifice 244 is disposed through the piston rod wall 240 and permits the flow of hydraulic fluid between the piston rod annular chamber 238 and the outer annular chamber 242. It should be noted that the chambers 236, 238 and 240 are filled with hydraulic fluid at all times.

For forward motion or extension of the piston rod 68, a quantity of hydraulic fluid is caused to flow through the blind end fluid connection 32 to the central cylindrical chamber 236. As part of this action, a certain quantity of fluid presses against an annular surface 246 indented in the piston 233, thereby causing the piston head 233, and therefore the piston rod 68, to move forward. At the other end of the piston rod 68, a quantity of hydraulic fluid continues through a hydraulic fluid connection 248 to the next cylinder. Additionally, the forward movement of the piston 233 causes the size of the outer annular chamber 242 to decrease and thereby forces hydraulic fluid in the outer annular chamber 242 to flow out of the cylinder 22 through the fluid connection 34 back to the hydraulic power unit 30 (see FIG. 1A).

For reverse motion or retraction of the piston, a quantity of hydraulic fluid is caused to flow through the rod end fluid connection 34 to the piston rod annular chamber 242. The incoming fluid then presses against an annular surface 250, thereby causing the piston 233, and therefore the piston rod 68, to move rearward. At the other end of the piston rod 68, a quantity of hydraulic fluid continues through a hydraulic fluid connection 252 to the next cylinder. Additionally, the rearward movement of the piston 233 causes a quantity of hydraulic fluid to flow out of the cylinder 22 through the fluid connection 32 back to the hydraulic power unit 30 (see FIG. 1A).

It should be understood that the process of extending and retracting the piston 68 in an intermediate cylinder or in the carriage cylinder 26 is substantially similar to the process described above. The main difference in this regard is that the intermediate cylinders 24 and the carriage cylinder 26 are supplied with hydraulic fluid not by the hydraulic fluid connections 32 and 34, but by the connecting hoses 74 and 76 which connect the cylinders 18 in series (see FIG. 2).

Fundamentally, automatic acquisition of a railroad car axle 100 (see FIG. 6) is carried out in much the same way as that of manual acquisition, the primary difference being a procedure for automatic location of the railroad car axle 100 to be acquired. Activation of the automatic acquisition cycle start button 212 on the operator's panel 62 (see FIGS. 16A, 16B and 16C) initiates an automatic, pre-programmed sequence of actions to be carried out by the railroad car positioner. Preferably, the cycle of automatic acquisition is initiated only if an axle 100 has already been acquired manually. Subsequently, primarily in reference to FIG. 4, the sequence of actions making up the automatic acquisition cycle preferably comprises the steps of: returning the lock bar 112 to its rest position; lowering the dogs 88 and 90; actuating motion of the carriage assembly 36 in the direction desired; counting four wheels by means of the counting assembly 144; stopping motion of the carriage assembly 36 at the fourth axle; and grasping the axle 100 by raising the dogs 88 and 90 first to their intermediate position (see FIG. 7) and then, as described previously, to their raised position (see FIG. 5); and re-activating the lock bar 110. The fourth axle, in either direction from the previous axle acquired, is generally preferably chosen in the automatic acquisition cycle because it occupies the same relative position on an adjacent railroad car as the position occupied by the previous axle acquired on the previous railroad car.

Referring now to FIG. 13, as the counting assembly 144 passes under a railroad car wheel, the proximity switches 150 are activated by the railroad car wheel. In addition to producing signals to count the number of railroad car wheels 160, the proximity switch 150 also produces an electrical signal which activates the "axle detected" indicator light 184 on the operator's panel 62 (see FIGS. 16A, 16B and 16C). Once the appropriate number of railroad car wheels 160 (and, therefore, axles) has been counted, motion of the carriage assembly 36 is terminated.

The disclosure now turns to aspects of the operation of the railroad car positioner, once the carriage assembly 36 has been positioned under the axle 100 desired for acquisition. FIG. 9 shows a simplified overview of the preferred system of proximity switches used in association with the axle pusher dogs 88 and 90. In general, the proximity switches 122, 124 are positioned close to the surface of reverse dog 90 and are positioned to indicate when the dogs 88, 90 are in the correct intermediate and raised positions. The proximity switches 122, 124 are activated when the dogs 88, 90 approach the proximity switches 122, 124. Proximity switch 126 is positioned to be activated by the forward dog 88 when it is in the fully lowered position.

As shown in FIG. 7, the cable 102 is connected to an intermediate point 108 along the length of the forward dogs 88. The axle dogs 88 and 90 are therefore pulled up into their intermediate position as the rod 106 retracts back into the electrical cylinder 86 and pulls on the cable 102. The dogs 88 and 90 are preferably arranged such that, initially, the forward dogs 88 are raised independently of the reverse dogs 90. However, once the forward dogs 88 have been raised adequately to afford a required angular separation between the forward dogs 88 and the reverse dogs 90, the pivot pin 94 engages the side of the hole 120 (see FIG. 8). Subsequently, the forward dog 88 and reverse dogs 90 move in tandem, maintaining a constant angle of separation. The axle dogs 88 and 90 are held in the intermediate position to allow the reverse dog 90 to move under the axle 100.

Referring now to FIG. 9, as the dogs 88 and 90 are raised into their intermediate position, the proximity switch 122 is activated thereby producing an electrical signal which activates the appropriate dog position indicator light 194 at the operator's panel 62 (see FIGS. 16A, 16B and 16C).

Now, referring again to FIG. 7, with the dogs 88 and 90 in their intermediate position, the carriage assembly 36 moves forward under the axle 100. The forward dogs 88 then come into contact with the axle 100. Through continued forward motion of the carriage assembly 36, the tandem ensemble of the forward dogs 88 and reverse dogs 90 pivot about the contact point of the forward dogs 88 and the axle 100. Consequently, as may be seen in FIG. 5, the reverse dogs 90 are caused to rise to a level equal with that of the forward dog 88. At this point, either the forward dogs 88 or the reverse dogs 90 are in a position to come into contact with the axle 100 and, therefore, to move the railroad car. During the transition of the dogs 88 and 90 from the intermediate position to the fully raised position, the cable 102, initially taut, becomes slack.

Also, as can be seen in FIG. 9, while the dogs 88 and 90 are being raised into their fully raised position, the reverse dogs 90 approach proximity switch 124, thereby producing a signal that activates the appropriate dog position indicator light 194 at the operator's panel 62 (see FIGS. 16A, 16B and 16C).

Referring now to FIGS. 4 and 8, with the dogs 88 and 90 in their fully raised position, a rod 254, extending from the electrical cylinder 84, pushes the ensemble of the locking slide 112 and the lock bar 110 along the pair of inclined ramps 116 and 118 mounted on the carriage assembly side bars 80. Motion of the lock bar 110 stops at a locking position in the notch 114 in the reverse dogs 90. Conversely, retraction of the rod 254 back into the electrical cylinder 84 causes the lock bar 110 to move from its locking position back into a retracted position at the forward end of the carriage assembly 36.

As shown in FIG. 11, when the lock bar 110 is in its retracted position, the proximity switch 134 is activated by an arm 256 of the locking slide 112. As the lock bar 110 is moved rearward by the locking slide 112, the proximity switch 134 is released. When the lock bar 110 reaches its locking position, another arm 258 of the locking slide 112 activates the proximity switch 136. Each of the proximity switches 134 and 136 produces an electrical signal, which signals serve both to cease motion of the lock bar 110 and to activate the appropriate lock bar position indicator light 204 at the operator's panel 62 (see FIGS. 16A, 16B and 16C).

With the axle pusher dogs 88 and 90 in their raised position around axle 100, as shown in FIG. 5, the forward dogs 88 are then able to effect a forward motion of the railroad car and the reverse dogs 90 are able to effect a reverse motion of the railroad car, both upon appropriate motion of the carriage assembly 36. Depending on the direction of travel, either the rollers 96 mounted on the forward axle pusher dog 88 or the rollers 96 mounted on the reverse pusher dogs 90 will remain in physical communication with the railroad car axle 100 as the railroad car is being moved.

Once the railroad car has been moved to its desired destination, the dogs 88 and 90 are returned to their lowered, resting position. Typically, the lock bar 110 and locking slide 112 return to their retracted positions. Then, the carriage assembly 36 moves in reverse and, conversely to the procedure for grasping an axle 100 described above, the dogs 88 and 90 are then able to return to their intermediate position. Finally, the dogs 88 and 90 are lowered back into their original, fully lowered position.

Referring once again to FIG. 9, when the dogs 88 and 90 are fully lowered, proximity switch 126 is activated by the pusher dogs 88 and an electrical signal is produced which activates the appropriate indicator light 194 at the operator's panel 62 (see FIGS. 16A, 16B and 16C).

It will be appreciated from the description of the carriage 36, set forth above, that the carriage 36 is a self-contained, battery-powered unit. All of the switches, solenoids, relays etc. which are provided in the carriage 36 are in radio communication with the main control unit 224 which, as noted above, preferably includes a programmable logic controller (i.e., a "PLC") which has been programmed, by means well understood by those of ordinary skill in the art, to provide the functional operation detailed herein. Additionally, all of the switches, controls, indicator lights, etc. provided on the operator's panel 62 are in electrical communication with the main control unit 224 and the PLC contained therein.

In the embodiment described previously, the operator controls the speed and direction of movement of the carriage 36 via a selector switch 198 (for selecting either forward or reverse movement) and a potentiometer 200 (for controlling the speed of movement of the carriage 36). Alternatively, a so-called "joystick" control could be employed to the same effect. In such case, the speed of the carriage 36, from zero to maximum, would preferably be a function of the deflection of the joystick handle from its zero point, and the direction of movement of the carriage 36 would depend upon the direction of such deflection (e.g., up vs. down or right vs. left).

When the apparatus is placed in the "auto acquisition" mode described previously, the direction selector switch 198 and the potentiometer 200 (or, alternatively, the joystick) and all other of the operator's controls (excepting the emergency stop button 222 and the automatic acquisition cycle stop button 214) are deactivated, and the movement of the carriage 36 is then controlled by the PLC included within the main control unit 224.

As discussed previously, the "auto acquisition" cycle is initiated with the carriage 36 locked onto an axle of a railroad car. In a particularly preferred embodiment of the invention, the PLC provided in the main control panel 224 is appropriately programmed so as to allow movement of the carriage 36, selectively, at any one of four preselected speeds, for example, a fast forward speed, a slow forward speed, a fast reverse speed and a slow reverse speed. In this embodiment, upon depression of the "start automatic acquisition" button 212, the carriage 36 moves at a "forward slow" speed to remove pressure from the lock bar 110. The lock bar 110 is then retracted, and the carriage 36 moves, at "reverse slow" speed, to rotate the dogs 88 and 90 to the "intermediate" position described previously. The carriage 36 then stops, and the dogs 88 and 90 are retracted to their "fully lowered" positions. Thereafter, the carriage 36 then travels, at a "fast" speed in the appropriate direction (either forward or reverse). As each wheel of the railroad car is passed, the "axle detected" light 184 is illuminated, and the PLC provided in the main control panel counts the axles which have been thus detected. In this preferred embodiment of the invention, once a third axle has been detected and passed, the PLC then shifts the carriage 36 to a "slow" speed and stops the carriage 36 at the fourth axle from the previous positioning of the carriage 36. The PLC then raises the dogs 88 and 90 to their "intermediate" positioning as described previously. The PLC then causes the carriage 36 to move at the "forward slow" speed to erect the dogs 88 and 90 to the fully "raised" position described previously. At this point, the PLC causes the lock bar 110 to engage and lock the dogs 88 and 90 on opposing sides of the newly acquired axle, and the cycle is complete.

The foregoing process may be modified by causing the PLC to shift the carriage 36 at a "fast" speed all the way to the fourth axle, instead of shifting the speed of the carriage 36 to "slow" once the third axle has been passed.

The four preselected speeds discussed previously are preferably adjustable, by appropriate programming of the PLC, as well as understood by those of ordinary skill in the art, to meet various system and environmental requirements.

Preferably, each movement of the carriage 36 is protected by a 5-second start delay, during which time, preferably, a warning device (for example, a horn and/or a flashing light) is activated. Preferably, these warning devices remain energized until all movement of the carriage 36 ceases.

The operator's panel 62 is preferably provided with some type of a "track obstruction" indicator light. Preferably, this indicator light is illuminated any time the dogs 88 and 90 are raised (e.g., are not in their fully lowered position).

A railroad car positioning apparatus constructed according to the invention as described herein offers a number of significant advantages. Among these are the following:

The operator is informed at all times about the status and activities of the apparatus by the indicator lights provided on the operator's panel 62.

The railroad car wheel detector can be provided as either a limit or proximity switch which is activated by the railroad car wheels.

Since it detects and counts axles, the apparatus automatically adjusts for railroad cars of differing lengths.

The extent of travel of the carriage 36 is easily adjustable and/or modifiable by changing the number and/or the displacement strokes of the hydraulic cylinders 18.

Since the apparatus is provided with two dogs 88 and 90 (i.e., forward and reverse), which are positionable on opposing sides of a railroad car axle, the apparatus effects a positive positioning of a railroad car and can either start or stop a railroad car or a string of railroad cars.

The apparatus can extend across track scales (e.g., weighing devices) commonly encountered at loading sites. The apparatus can be employed on, preferably, either the first or third axle of a railroad car.

The apparatus can function under an operator's manual control or in an automatic mode provided by appropriate programming of a commonly available PLC.

The apparatus can be employed to either push or pull railroad cars past a given point, for example, a scale or loading area.

The apparatus can be employed to push railroad cars, without using the lock bar 110 described previously. For example, the apparatus can be employed to push railroad cars away from a scale.

It will be further appreciated from the description of the carriage 36 set forth previously that all power, electrical, and control (i.e., radio) components necessary for the actuation and control of the mechanical components of the carriage 36 are built into the structure of the carriage 36. It should also be noted that, despite the intricacies of the layout of the electrical and mechanical components therein, it is still possible to afford a high level of precision and versatility in the control and monitoring of the electrical and mechanical components via radio, and to do so with minimal difficulty from a remote location. As was described in detail previously, these advantages are afforded by the preferred arrangement of the operator's panel 62 and the main control unit 224.

Figure 19:
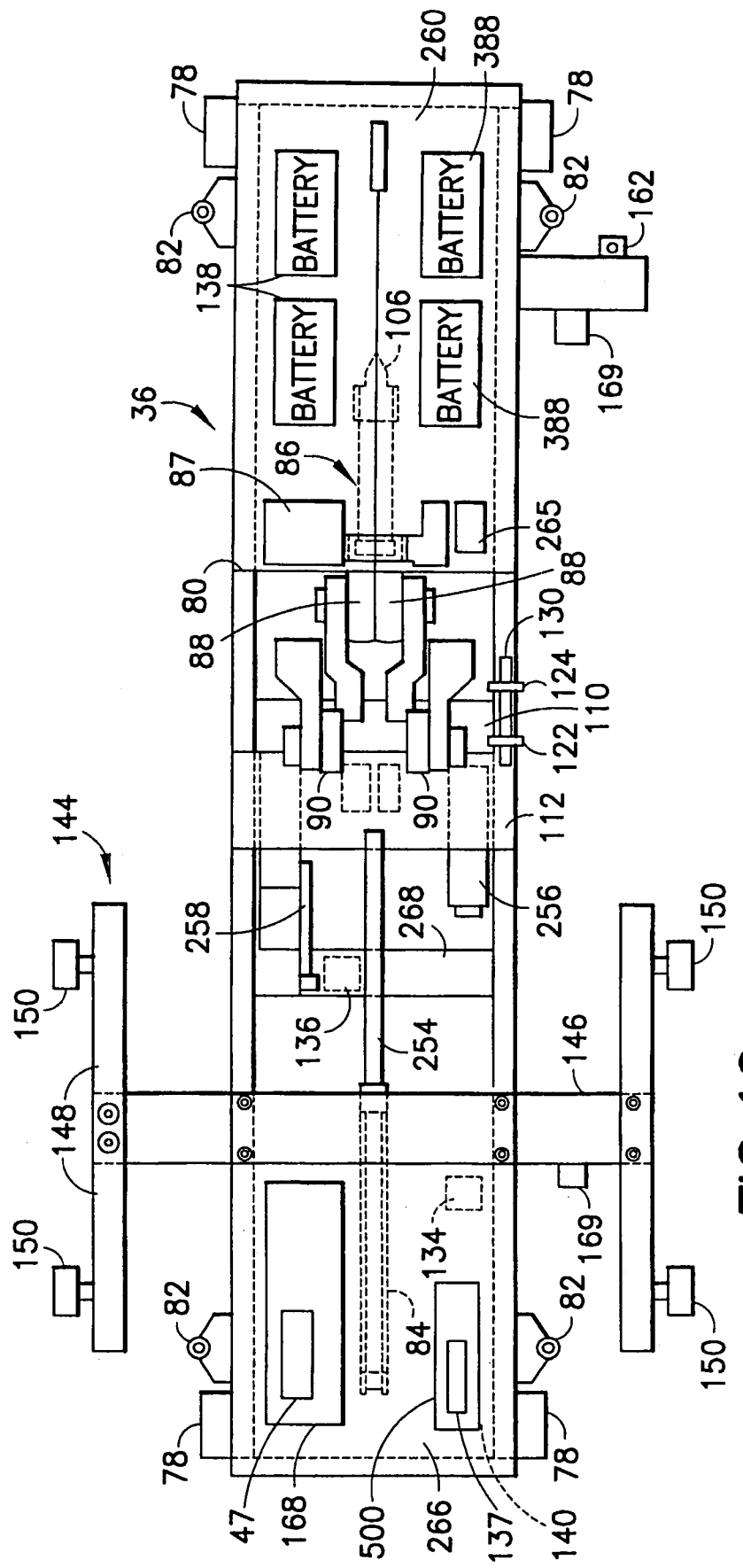
FIG. 19 is a similar view as FIG. 4.

Additionally, substantially all electrical and mechanical components of the carriage 36 are covered thereby protected from the environment. A cover plate 260 on the reverse end of the carriage 36, as seen in FIG. 19, shelters the axle dog electrical cylinder 86, the switch 265, and batteries 138. Switch 265 is adapted to disconnect the batteries 138 from all devices and is mounted in the carriage assembly 36.

Another cover plate 266 on the forward end of the carriage 36 shelters the lock bar proximity switches 134, 136, electrical control box 168, battery charging system 500, and the lock bar electrical cylinder 84. Additionally, a cross brace 268 supports the lock bar proximity switch 136.

As was discussed previously, the railroad car wheel counting assembly 144 is preferably provided with the protection cover 148, which cover shelters the proximity switch 150 therein.

The invention as described hereinabove in the context of the preferred embodiments is not to be taken as limited to all of the provided details thereof, since modifications and variations thereof may be made without departing from the spirit and scope of the invention.

The invention claimed is:

1. A remotely-controlled carriage assembly for automatically engaging and positioning railroad cars in a train of the railroad cars along a railroad track, comprising:
   a support frame having wheels and adapted to move along a guide way provided between the pair of rails of the railroad track;
   a radio disposed on the support frame for transmitting radio signals to and receiving radio control signals from a remotely-located main control unit;
   at least one forward dog and at least one reverse dog pivotally mounted to the support frame, the at least one forward dog and at least one reverse dog movable between a lowered position beneath an axle height of the railroad cars and a any raised position for engaging one of the railroad cars;
   dog proximity indicators disposed on the support frame and electrically connected to the radio, the dog proximity indicators adapted to produce signals indicating the positioning of the at least one forward dog and at least one reverse dog, respectively; and
   a counting assembly disposed on the support frame and adapted to count the number of the railroad cars that the carriage assembly passes as the carriage assembly moves along the guide way, the counting assembly comprising a plurality of counting proximity indicators disposed on the support frame and electrically connected to the radio, the counting proximity indicators adapted to produce signals when the carriage assembly reaches a preselected one of the railroad cars to be engaged by the at least one forward dog and at least one reverse dog;
   wherein the radio is adapted to transmit the signals received from the dog proximity indicators and counting proximity indicators to the remotely-located main control unit, and receive the radio control signals from the main control unit.

2. The carriage assembly of claim 1, further including a lock device for holding the at least one forward dog and the at least one reverse dog in the raised position.

3. The carriage assembly of claim 1, further including a lock device for holding the at least one forward dog and the at least one reverse dog in the raised position.

4. The carriage assembly of claim 3, wherein the lock bar is movable between a locked position wherein the lock bar holds the at least one forward dog and at least one reverse dog in the raised position, and an unlocked position wherein the lock bar is disposed apart from the at least one forward dog and the at least one reverse dog.

5. The carriage assembly of claim 4, further including a lock bar proximity indicator disposed on the support frame and electrically connected to the radio, the lock bar proximity indicator adapted to produce signals indicating when the lock bar is in the locked and unlocked positions and communicate the signals to the radio.

6. The carriage assembly of claim 5, wherein the lock bar proximity indicator is battery-powered.

7. The carriage assembly of claim 1, wherein the radio, dog proximity indicators, and counting proximity indicators are battery-powered by a battery disposed on the support frame.

8. The carriage assembly of claim 7, further including a power disconnect switch for disconnecting the battery from the radio, dog proximity indicators, and counting proximity indicators.

9. The carriage assembly of claim 1, wherein at least one of the dog proximity indicators is positioned to be actuated by at least one of the dogs.

10. The carriage assembly of claim 1, further including a battery disposed on the carriage assembly for providing a source of electrical power to the carriage assembly.

11. An apparatus for automatically engaging and positioning railroad cars in a train of the railroad cars along a railroad track, comprising:
- a guide way situated between the pair of rails of the railroad track; a remotely-located main control unit;
- a carriage assembly movable along the guide way, the carriage assembly including:
- a radio disposed on the support frame for transmitting radio signals to and receiving radio control signals from the main control unit;
- at least one forward dog and at least one reverse dog pivotally mounted to the support frame, the at least one forward dog and at least one reverse dog movable between a lowered position beneath an axle height of the railroad cars and a raised position for engaging one of the railroad cars;
- dog proximity indicators disposed on the support frame and electrically connected to the radio, the dog proximity indicators adapted to produce signals indicating the positioning of the at least one forward dog and at least one reverse dog, respectively;
- a counting assembly disposed on the support frame and adapted to count the number of the railroad cars that the carriage assembly passes as the carriage assembly moves along the guide way, the counting assembly comprising a plurality of counting proximity indicators disposed on the support frame and electrically connected to the radio, the counting proximity indicators adapted signals when the carriage assembly reaches a preselected one of the railroad cars to be engaged the at least one forward dog and at least one reverse dog; and
- a plurality of guide way proximity indicators electrically connected to the main control unit and adapted to produce signals indicating at least the position of the carriage assembly on the guide way;
- wherein the radio is adapted to transmit the signals received from the dog proximity indicators and counting proximity indicators to the main control unit and receive the radio control signals from the main control unit, the main control unit controlling the carriage assembly based on the receive signals from the radio and the position signals received from the guide way proximity indicators, the main control unit controlling the carriage assembly by the radio control signals transmitted to the radio disposed on the carriage assembly.

12. The apparatus of claim 11, wherein the guide way includes a plurality of axially aligned, double acting hydraulic cylinders, each cylinder having an axially aligned piston rod for displacing the carriage assembly in one of a forward or reverse direction along the guide way as the piston rods are extended or retracted under hydraulic fluid pressure, for exerting a force between the at least one forward dog and at least one reverse dog and an acquired railroad car for moving an engaged railroad car.

13. The apparatus of claim 11, wherein the guide way includes a plurality of axially aligned, double acting hydraulic cylinders, each cylinder having an axially aligned piston rod for displacing the carriage assembly in one of a forward or reverse direction along the guide way as the piston rods are extended or retracted under hydraulic fluid pressure, for exerting a force between the at least one forward dog and at least one reverse dog and an acquired railroad car for moving an engaged railroad car.

14. The apparatus of claim 11, wherein the main control unit includes a track-side radio for transmitting the radio control signals to the radio disposed on the carriage assembly.

15. The apparatus of claim 11, wherein the guide way proximity indicators include an end travel proximity indicator, a wheel detector proximity indicator, and a deceleration proximity indicator disposed on the guide way at a reverse travel end of the guide way.

16. The apparatus of claim 15, wherein the guide way proximity indicators further include a wheel clear proximity indicator disposed on the guide way at the reverse travel end of the guide way.

17. The apparatus of claim 11, wherein the guide way proximity indicators include an end travel proximity indicator and deceleration proximity indicator disposed on the guide way at a forward travel end of the guide way.

18. A method of acquiring and positioning railroad cars in a train of the railroad cars along a railroad track, comprising:
- providing an apparatus adapted to selectively engage and position one of the railroad cars, the apparatus positioned on a guide way provided between the pair of rails of the railroad track, and comprising:
- a track-side main control unit;
- a carriage assembly movable along the guide way, the carriage assembly including:
- a support frame;
- a radio disposed on the support frame for transmitting radio signals to and receiving radio control signals from the main control unit;
- at least one forward dog and at least one reverse dog pivotally mounted to the support frame, the at least one forward dog and at least one reverse dog movable between a lowered position beneath an axle height of the railroad car and a raised position for engaging one of the railroad cars;
- dog proximity indicators disposed on the support frame and electrically connected to the radio and adapted to produce signals indicating the positioning of the at least one forward dog and at least one reverse dog, respectively;
- a counting assembly disposed on the support frame and adapted to count the number of the railroad cars that the carriage assembly passes as the carriage assembly is moved along the guide way, the counting assembly comprising a plurality of counting proximity indicators disposed on the support frame and electrically connected to the radio; and
- a plurality of guide way proximity indicators electrically connected to the main control unit;
- wherein the radio is adapted to transmit the signals received from the dog proximity indicators and counting proximity indicators to the main control unit;

moving the at least one forward dog and at least one reverse dog to the dog lowered position by one of the radio control signals transmitted from the main control unit to the radio on the carriage assembly causing the carriage assembly to move along the guide way;

counting the railroad cars as the carriage assembly moves along the guide way and transmitting the number of the railroad cars counted to the main control unit as a counted radio signal;

stopping the carriage assembly when a preselected number of the railroad cars has been counted by one of the radio control signals transmitted from the main control unit to the radio on the carriage assembly;

moving the at least one forward dog and at least one reverse dog to the raised position and acquiring one of the railroad cars by one of the radio control signals transmitted from the main control unit to the radio on the carriage assembly;

moving the acquired one of the railroad cars a selected distance and stopping the railroad car by one of the radio control signal transmitted from the main control unit.

19. The method of claim 18, further including monitoring the position of the carriage assembly on the guide way with the guide way proximity indicators, and controlling the carriage assembly with radio control signals transmitted from the main control unit to the radio on the carriage assembly based on signals from the guide way proximity indicators.

* * * * *